United States Patent [19]
Hostetter

[11] Patent Number: 4,866,395
[45] Date of Patent: Sep. 12, 1989

[54] UNIVERSAL CARRIER RECOVERY AND DATA DETECTION FOR DIGITAL COMMUNICATION SYSTEMS

[75] Inventor: G. Robert Hostetter, Santa Clara, Calif.

[73] Assignee: GTE Government Systems Corporation, Stamford, Conn.

[21] Appl. No.: 291,485

[22] Filed: Dec. 28, 1988

Related U.S. Application Data

[63] Continuation of Ser. No. 271,244, Nov. 14, 1988.

[51] Int. Cl.[4] .................... H04L 27/06; H04L 27/22
[52] U.S. Cl. ............................. 329/309; 375/39; 375/81
[58] Field of Search ............... 329/50, 122, 124, 126, 329/135; 375/80, 81, 83–87, 94, 97, 98, 120, 39

[56] References Cited

U.S. PATENT DOCUMENTS

| | | | |
|---|---|---|---|
| 4,404,532 | 9/1983 | Welti | 329/124 X |
| 4,546,322 | 10/1985 | Crutcher | 329/124 X |

OTHER PUBLICATIONS

"A Generalized 'Polarity-Type' Costas Loop for Tracking MPSK Signals", by Holly C. Osborne, IEEE Transactions on Communications, vol. Com-30, No. 10, Oct. 1982, pp. 2289–2296.

"Carrier Recovery Systems for Arbitrarily Mapped APK Signals", by Yoshio Matsuo and Junji Namiki, IEEE Transactions on Communications, vol. COM-30, No. 10, Oct. 1982, pp. 2385–2390.

*Primary Examiner*—Siegfried H. Grimm
*Attorney, Agent, or Firm*—Douglas M. Gilbert

[57] ABSTRACT

A universal demodulator programmable for any digitally modulated carrier signal having a known constellation format which can be characterized by a unique constellation pattern of phase-amplitude states. The demodulator also generates phase and gain-error signals for locking onto the phase and amplitude of the digitally modulated carrier. The demodulator splits the received digitally modulated carrier signal into an inphase component, $D_x$, and a quadrature-phase component, $D_y$. Using a preprogrammed memory device keyed to the identified modulation format, each $D_x$ signal is mapped into one of a plurality of one-dimensional zones each having $R_x$ center values. Using a second preprogrammed memory device also keyed to the identified modulation format, each $D_y$ signal is similarly mapped into a plurality of orthogonal one-dimensional zones having $R_y$ centers. Each pair of $R_x$ and $R_y$ values represents a point in a two-dimensional signal space corresponding to one of the transmitted phase amplitude states. The data assignment signals, $A_x$ and $A_y$, are generated and outputted by selecting a predetermined portion of the $R_x$ and $R_y$ center values. Using the digital signals $R_x$, $R_y$, $D_x$ and $D_y$ and signal vector relationships, a logic circuit generates for each periodic signal pair a phase-error signal $\Phi_e$ corresponding to the phase difference between the phase angle associated with ($D_x$ and $D_y$) and the phase angle associated with ($R_x$ and $R_y$). Also generated is a gain-error signal $G_e$ corresponding to the amplitude differential between the amplitude associated with ($D_x$ and $D_y$) and the amplitude associated with the signal pair ($R_x$ and $R_y$). The phase and amplitude of the modulated carrier signal is adjusted in accordance with the phase-error signal $\Phi_e$ and the gain-error signal $G_e$ respectively.

28 Claims, 20 Drawing Sheets

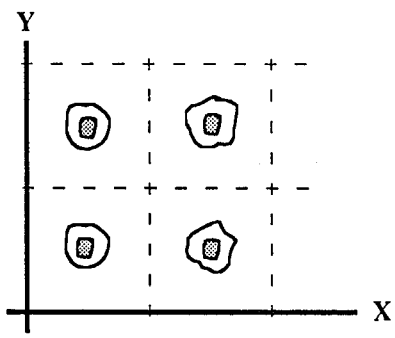
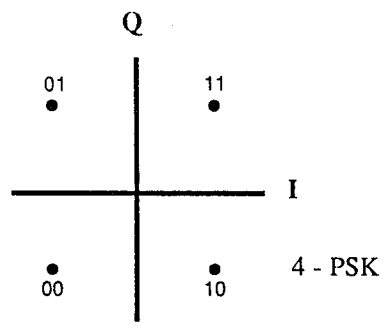
FIG. 3  FIG. 4A
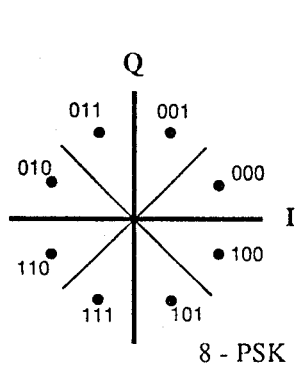
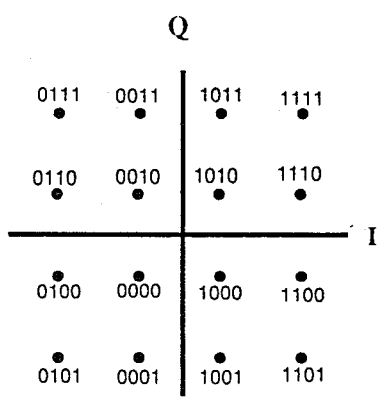
FIG. 4B  FIG. 4C

TWO - DIMENSIONAL SLICING

* - CORRECT
○ - INCORRECT

UNIVERSAL CARRIER RECOVERY AND DATA DETECTION FOR DIGITAL COMMUNICATION SYSTEMS

RELATED APPLICATIONS

The invention described herein is a Continuation of the following patent application entitled "UNIVERSAL CARRIER RECOVERY AND DATA DETECTION FOR DIGITAL COMMUNICATION SYSTEMS, Serial No. 271,244, filed on Nov. 14, 1988.

BACKGROUND OF THE INVENTION

1. Field of the Invention

The present invention relates generally to digital demodulators and more specifically to an improved technique for synchronizing a demodulator to the frequency and phase of a modulated carrier signal. This technique is particularly advantageous when the modulation format of the carrier signal is any one of a known plurality of different modulation formats. In particular this invention relates to a method and apparatus for demodulating a modulated carrier and for producing phase- and gainerror signals in the carrier recovery loop of a demodulator programmed for a particular phase and amplitude modulation format.

2. Description of the Prior Art

There are a number of different modulation schemes where the phase and/or amplitude of a carrier signal are varied to transmit digital information. Six of the most commonly used digital modulation formats are depicted by the phase and amplitude state diagrams shown in FIGS. 1A–1F. The phase shift keying (PSK) format is illustrated by the constellation patterns in FIGS. 1A and 1B. The quadrature amplitude modulation (QAM) format is illustrated by the constellation patterns in FIGS. 1D and 1F. 3- and 7-level quadrature partial response format signals (also referred to as 9 QPR and 49 QPR respectively) are illustrated by the constellation patterns in FIGS. 1C and 1E. (The phrase "constellation pattern" is used herein in its normal sense, i.e. the two-dimensional diagram of the in-phase and quadrature phase signal components.) The amplitude-phase keying (APK) formats considered here include multilevel QAM, arbitrarily mapped APK, symmetrical APK, and unsymmetrical APK.

The modulation formats illustrated in FIGS. 1A–1F can be divided into two general classes. The first class is characterized by PSK modulation, examples of which are illustrated by the constellation patterns in FIGS. 1A and 1B. In a phase-modulated signal the carrier amplitude is held constant as its phase is rapidly shifted by different multiples of a phase interval. There are normally an even number of possible phase states in this type of modulation format, typically 2, 4, 8, 16, etc. In the 8-phase PSK format, data is modulated by the phase of the carrier abruptly changing from one phase to another by some multiple of 45° phase shift.

In the second class of modulation formats, not only is the phase changed between data points, but the amplitude of the modulated signal can also change. The remaining four constellation patterns shown in FIGS. 1C–1F are examples of the second class of modulated signal formats: 3-level partial response, 16-QAM, 7-level partial response, and 64-QAM modulation formats. Commerical telephone modems typically use both classes of modulation formats.

Most state-of-the-art communication receivers are designed to demodulate a particular class of modulated signals. This assures that a receiver is not only capable of demodulating the particular modulation format used by the transmitter, but also that it is efficient for the type of modulation in use. It does, however, limit the receiver to working with a particular class of modulated signals. Even special purpose receivers are limited to demodulating a carrier modulated with a modulation format from only one of the two classes of modulation types. This is because no single demodulating technique exists which is capable of handling all types of modulation formats (except for switchable receivers which in reality is not a single demodulator at all since it has multiple demodulators). A particular carrier recovery system (demodulator) that uses a ROM (read only memory) table look-up method of sequentially deciding which data points of a signal constellation pattern are actually transmitted is disclosed in CARRIER RECOVERY SYSTEMS FOR ARBITRARILY MAPPED APK SIGNALS by Yoshio Matsuo and Junji Namiki, IEEE Transactions on Communications, Vol. COM-30, No. 10, October 1982, pages 2385–2390. The demodulator is optimized for fast acquisition and has a one bit error output—the error being an indication that the data point is not within the center of the decision zone of the demodulator. Phase and amplitude errors needed to lock the receiver onto the carrier are measured using dedicated circuitry. The author does not address more sophisticated error output implementations. A carrier recovery system that uses a different approach to track PSK signals is disclosed in A GENERALIZED "POLARITY-TYPE" COSTAS LOOP FOR TRACKING MPSK SIGNALS by Holly C. Osborne, IEEE Transactions on Communications, Vol. COM-30, No. 10, October 1982, pages 2289–2296. This reference describes a system of x and y quantization usable in PSK systems. It does not address the possibility of new data states nor does it address how to resolve data states from these new and ambiguous states. As an example, a 16-QAM tracker can lock onto 8-PSK signals very well. However the eight extra phase and amplitude states do reduce the trackers functioning in a low signal-to-noise environment, as pointed out in the paper, and the eight new data values created are ambiguous.

Typically a plurality of different receivers (or family of receivers), each designed to accommodate a different modulation type or signal constellation pattern, selectively receives and demodulates a carrier signal having any one of a number of different modulation formats. This approach, as discussed therein, has the distinct disadvantage of using a large amount of hardware.

The subject invention overcomes these drawbacks by employing a demodulation technique and receiver capable of recovering data from any modulated carrier signal if the modulation format is apriori known. By "programming" the receiver with the constellation pattern for a particular modulation format, the receiver is capable of demodulating a carrier signal having that particular modulation format.

An object of this invention is the provision of a universal carrier recovery circuit for the demodulator of a digital data communication system.

SUMMARY OF THE INVENTION

The above and other objects, advantages and capabilities are achieved in one aspect of the invention by a universal demodulator structure that can be programmed to demodulate any digitally modulated carrier signal providing the modulation type has a known constellation format. The demodulation technique also provides phase and gain-error signals for locking the demodulator to the proper phase and amplitude of the modulated carrier.

The demodulator splits the received digitally modulated carrier signal into an in-phase component, $D_x$, and a quadrature-phase component, $D_y$. Using a preprogrammed memory device keyed to the identified modulation format, each $D_x$ signal is mapped into one of a plurality of one-dimensional zones each having $R_x$ center values. Using a second preprogrammed memory device also keyed to the identified modulation format, each $D_y$ signal is similarly mapped into a plurality of orthogonal one-dimensional zones having $R_y$ centers. Each pair of $R_x$ and $R_y$ values represents a point in a two-dimensional signal space corresponding to one of the transmitted phase amplitude states. The data assignment signals, $A_x$ and $A_y$, are generated and outputted by selecting a predetermined portion of the $R_x$ and $R_y$ center values. Using the digital signals $R_x$, $R_y$, $D_x$ and $D_y$ and signal vector relationships, a logic circuit generates for each periodic signal pair a phase-error signal $\Phi_e$ corresponding to the phase difference between the phase angle associated with ($D_x$ and $D_y$) and the phase angle associated with ($R_x$ and $R_y$). Also generated is a gain-error signal $G_e$ corresponding to the amplitude differential between the amplitude associated with ($D_x$ and $D_y$) and the amplitude associated with the signal pair ($R_x$ and $R_y$). The phase and amplitude of the modulated carrier signal is adjusted in accordance with the phase-error signal $\Phi_e$ and the gain-error signal $G_e$ respectively. This adjusts the input constellation pattern to be coincident with the internal mapping structure of the demodulator. The data assignment $A_x,A_y$ corresponds to a digital value for transmitted phase-amplitude state.

BRIEF DESCRIPTION OF THE DRAWINGS

For a better understanding of the invention as well as other objects and further features thereof, reference is made to the following description which is to be read in conjunction with the accompanying drawings wherein:

FIG. 3 illustrates a typical video x-y display showing a QPSK signal.

FIGS. 4A-4C illustrate three constellation patterns and a binary coding associated with each data point.

DETAILED DESCRIPTION OF THE INVENTION

Figure 1A:
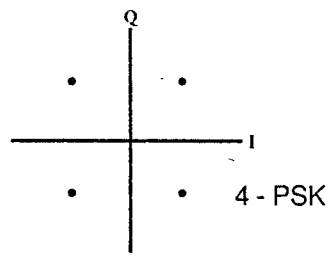
FIGS. 1A-1F illustrate various signal constellation patterns associated with digital modulation schemes in which groups of n-bits define specific phase and amplitude states during a signal symbol interval.
Figure 1D:
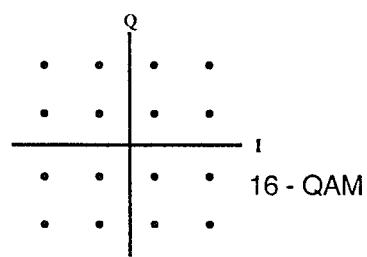
Figure 1B:
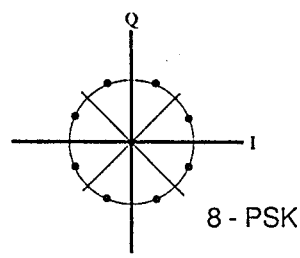
Figure 1E:
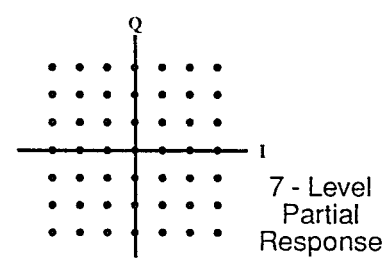
Figure 1C:
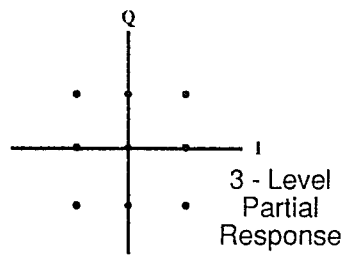
Figure 1F:
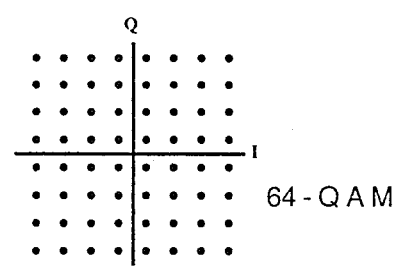
Figure 2:
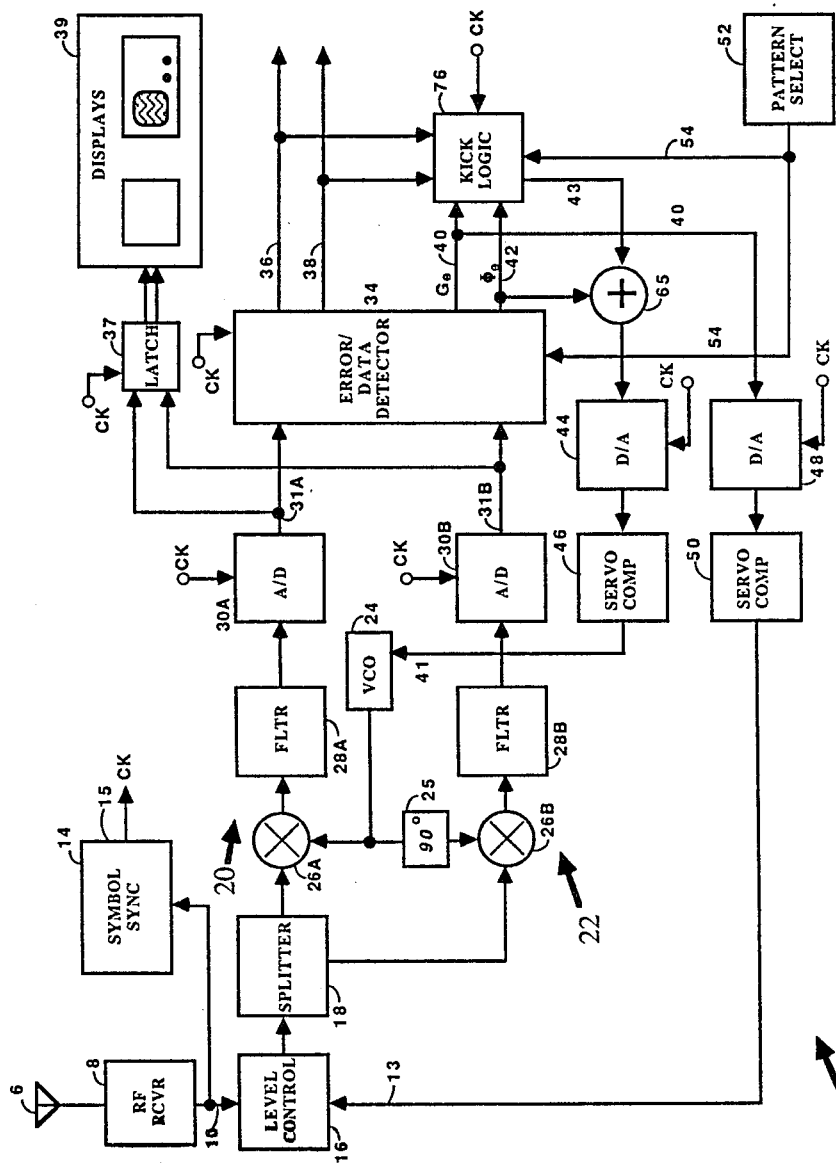
FIG. 2 is a schematic block diagram of a universal carrier recovery system and demodulator in accordance with this invention.

For a better understanding of the subject invention, reference is made to the following description and appended claims in conjunction with the above-described drawings. FIG. 2 illustrates a block diagram of a receiver in which the subject invention has application. The receiver, which forms a part of a digital communication system, generally comprises a microwave antenna 6, a microwave receiver 8, and a digital demodulator 12. Although this particular structural embodiment is shown with reference to a microwave transmission system, the demodulation technique has utility in a large variety of demodulating and transmission environments, one example being a fiber optic cable transmission system.

Functionally antenna 6 receives an incoming modulated RF signal. RF receiver 8 downconverts the received RF to an IF (intermediate frequency) signal (e.g. 70 MHz) on path 10, and an AGC circuit in receiver 8 coarsely adjusts the adverage amplitude of the IF signal to a prescribed level. The modulation formation of the IF signal on path 10 may be any format so long as its constellation pattern is known and is capable of being "programmed" into the demodulator 12. (Further explanation of what is meant by "programmed" is discussed below.) A symbol timing synchronization circuit 14, (also called a clock recovery circuit) which includes the requisite distribution circuitry, operates on the 70 MHz IF signal to derive adjustable clock pulses edge synchronized with the data symbol transitions of the received signal. The distributed clock pulses on path 15 control the timing and stepping of the digital processing of the demodulator 12. The other elements shown in FIG. 2 comprise a digital demodulator generally referred to as demodulator 12.

Level control circuit 16 variably adjusts the level of the modulated IF signal on path 10 in responseto a control signal fedback on path 13. Level control circuit 16 could include an amplifier, attenuator or other AGC circuit depending upon the output signal characteristics of receiver 8. A power splitter 18 divides the IF signal into two equal strength signals enabling the balanced mixers, 26A and 26B, phase shifter 25, and VCO (voltage controlled oscillator) 24 to develop in-phase (I) and quadrature phase (Q) channels 20 and 22, respectively. Each of the channels 20 and 22 also comprises a baseband (lowpass) filter 28 and an A/D (analog-to-digital) converter 30. The A/D converters sample and quantize the filtered signal into a seven bit word each symbol period. Such a scheme (circuits 18, 26, 28, and 30) is a fairly standard technique for developing digitized I and Q channels prior to processing by detector 34. Also, a digital equalizer (not shown) may be employed in each channel between A/D converter 30 and detector 34 to compensate for path distortion and intersymbol interference. The digital output signals on 31A and 31B are also set into latch circuit 37 to drive a display device 39 such as an x,y CRT display. Display device39 displays the phase and amplitude states of the quadrature signals on paths 31A and 31B as shown in FIG. 3 for determining the modulation format of the incoming signal if it is not apriori known. Having once identified the modulation format type, an operator switches and locks the programming of detector 34 to the optimum demodulation process. This is shown diagrammatically in FIG. 2 by control unit 52 such as a pc keyboard which sends an actuting control signal (pattern select) on path 54 to detector 34 and logic circuit 76. A manual modulation format selection process is shown as an aid in understanding how the format could be determined and how the detector could be switched to demodulate any digitally modulated carrier signal; however, format selection whether automatic or manual is not considereda part of this invention.

The digitized quadrature components on paths 31A and 31B, designated herein as $D_x$ and $D_y$, respectively, are in a form to be demodulated by detector 34. Functionally error detector 34 determines the proper phase and amplitude state of these signals and generates for each quantized signal pair $(D_x,D_y)$ the following digital signals:

a reference value $(R_x,R_y)$, a data assignment value $(A_x,A_y)$, a phase-error signal $\Phi_e$, and a gain-error signal $G_e$.

The last three of these are always outputted as digital signals from detector 34. (In some embodiments, the reference value $(R_x,R_y)$, is an internal value employed to determine the other three signals.) The phase-error signal $\Phi_e$ and the gain-error signal $G_e$ are one measure of the deviation of the received input signal components from what was transmitted. The data assignment values $(A_x,A_y)$ correspond to a version of the demodulated data, unless the binary assignments happen to correspond to the exact assignments at the transmitter, in which event the outputted $(A_x,A_y)$ values will be the same as the transmitted data. A data coding/zone assignment format using Gray codingis shown in FIGS. 4A–4C for 4-PSK, 8-PSK and 16-QAM modulation formats.

Figure 5A:
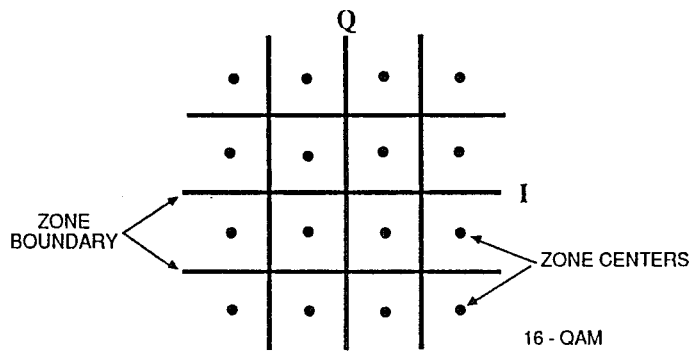
FIGS. 5A and 5B illustrate phase error in the tracking of a 16-QAM constellation pattern, as contrasted with the no-error illustration.
Figure 5B:
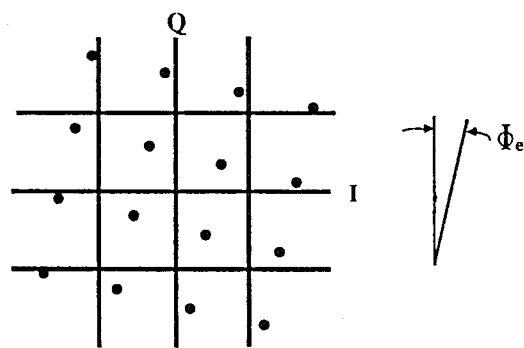
Figure 6:
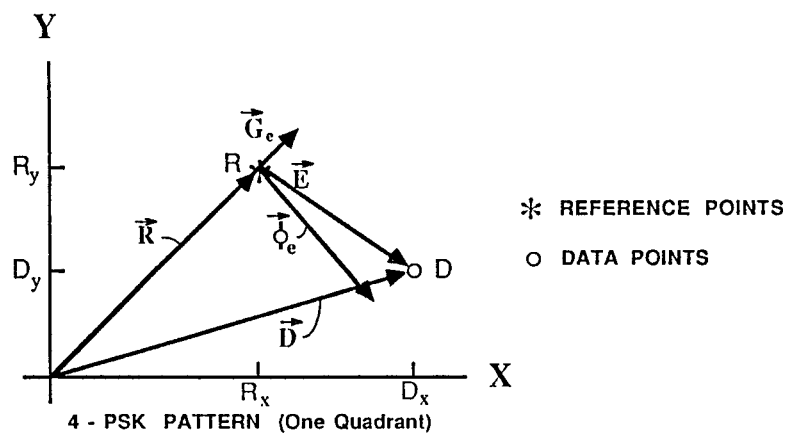
FIG. 6 is a greatly enlarged graphic representation of the first quadrant of a QPSK constellation pattern illustrating the reference data vector $\overline{R}$ for the correct or reference data point R in the first quadrant, a received data vector $\overline{D}$ associated with a representative phase and amplitude position of a received signal point D, and the phase error $\vec{\Phi}_e$ and gain error $G_e$ for the associated error vector $\overline{E}$.

Each $(D_x,D_y)$ sample, being a quantized pair of numbers, may be mapped into a two-dimensional (x,y) or (I,Q) signal space as shown in FIG. 1. Since the sampling period of the A/D converters 30 corresponds to the data symbol interval, each $(D_x,D_y)$ sample represents, under perfect conditions, a data point in whatever constellation pattern is being transmitted. Conceptually the demodulation process divides the signal space into a structure of zones (which may be thought of as decision areas) so that each data point in the selected constellation pattern exactly fits within a defined zone. The zones are defined within detector 34 by boundary lines which are typically equidistant between surrounding data points; however, the zones are not necessarily square or rectangular. The input signal data points lie in the center of the zones under perfect conditions with no distortion and in the absence of noise. Since some modulation formats have zones that are unbounded (e.g. 8-PSK) and thus have no exact centers, this phrase is inaccurate with respect to those particular zones; however, the term "center" is still used herein just for the sake of convenience. As will be explained in more detail later, different zone patterns may be programmed into detector 34 to produce a unique and typically optimal alignment for each constellation pattern. The zone pattern partially illustrated in FIG. 5A represents a properly aligned 16-QAM constellation pattern. Any phase or amplitude distortion of the received carrier signal results in a constellation pattern that is misaligned within a zone pattern generated for that particular modulation type. FIG. 5B illustrates the same 16-QAM constellation pattern signal having a small amount of phase misalignment with the appropriate 16-QAM zone pattern overlaid. A center or no error point in each zone is used as a reference point from which the phase and the amplitude errors are calculated for any data point position within the associated zone. This so-called reference position, which as explained above is usually in the center of a zone, is designated herein as $(R_x, R_y)$. A reference vector $\vec{R}$ is defined as a vector extending from the center of the constellation pattern to the reference position $(R_x, R_y)$ in a particular zone. The $\vec{R}$ vector is illustrated in FIG. 6 in the first quadrant of a 4-PSK constellation pattern along with a received data point vector $\vec{D}$ (also referred to herein as the signal vector) having the components $(D_x, D_y)$. The error vector $\vec{E}$ is also illustrated therein and represents the difference vector between $\vec{D}$ and $\vec{R}$.

Referring to FIG. 2 again, detector circuit 34 produces digital gain and phase-error signals on paths 40 and 42, respectively, for use in correcting misalignment such as is shown in FIG. 5B. The consequence of data points not being centered in the zones is an increase in the bit error rate (BER) of the demodulated data. Each digital word representing the phase-error signal $\Phi_e$ is converted to an associated analog signal by D/A (digital-to-analog) converter 44, although this could be done just as easily on a digital basis. A servo compensation circuit 46 processes this analog voltage for controlling the output signal phase of VCO 24 which drives mixers 26A and 26B. Conceptually the analog phase-error signal on path 41 adjusts the VCO 24 to rotationally orient the axes of the constellation pattern of the input signals to be coincident with orthogonal axes of the zone pattern preprogrammed into detector circuit 34 for each different constellation pattern to be demodulated. In a similar manner D/A converter 48 and compensation circuit 50 convert the digital signal representing the gain-error signal on path 40 to a corresponding analog signal for controlling the amount of gain or loss inserted in path 10 by the level control circuit 16. In terms of the zone pattern, variations of the IF signal level have the effect of displacing the received data points radially from the origin of the grid pattern. The origin is the position of a zero carrier amplitude level. Alternatively the output of circuit 50 may control the reference input of A/D converters 30A and B for accomplishing the same function. The servo compensation circuits 46 and 50 are conventional servo loop designs well known in the art. Besides generating digital gain and phase-error signals, detector circuit 34 also generates on paths 36 and 38 the zone data assignment $(A_x, A_y)$ for each received phase-amplitude state which is outputted as the demodulated data signal. There are two specific embodiments of this process discussed herein: one-dimensional and two-dimensional.

One-dimensional Processing

Figure 8:
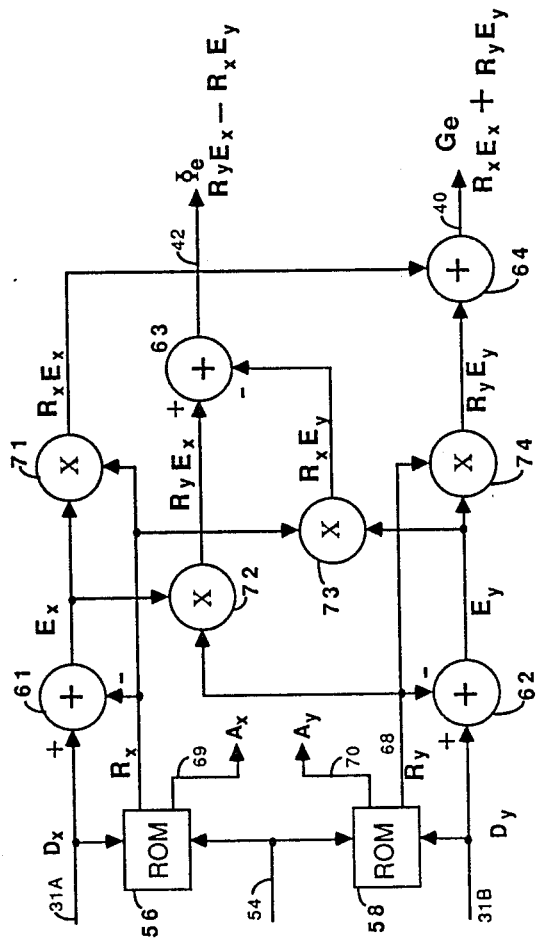
FIG. 8 is a schematic block diagram of a universal error detector (34 in FIG. 2) in accordance with this invention.
Figure 9:
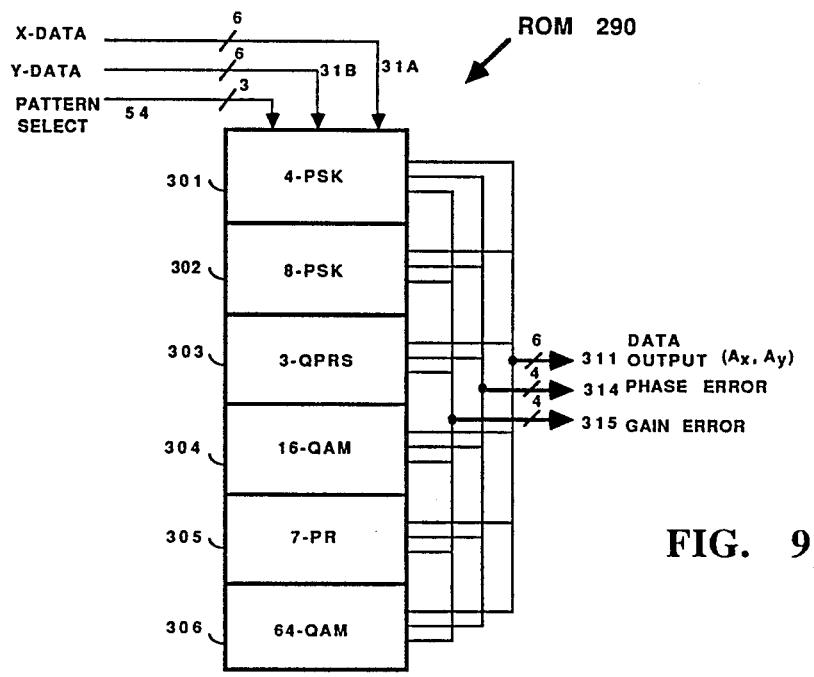
FIG. 9 is a functional block diagram and memory bank map of a universal error detector 34 shown in FIG. 2.
Figure 10A:
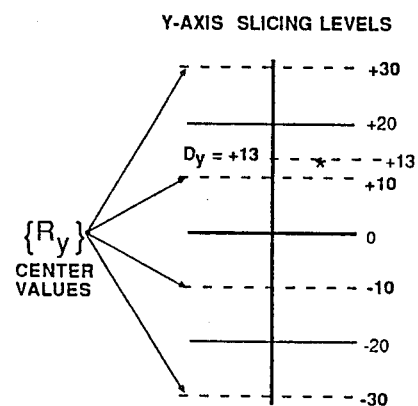
FIGS. 10A-10C relate to the one-dimensional processing and aids the explanation in text.
Figure 10C:
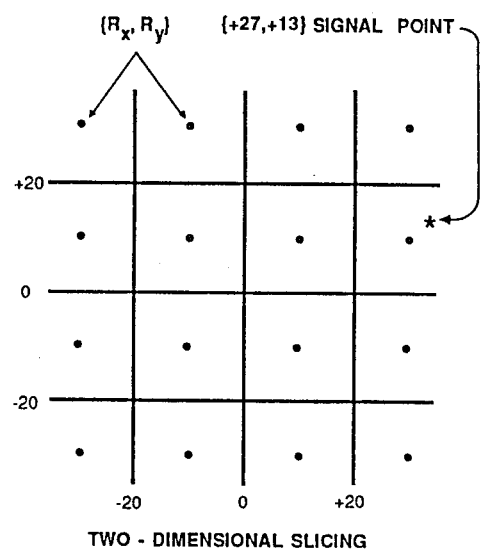
Figure 10B:
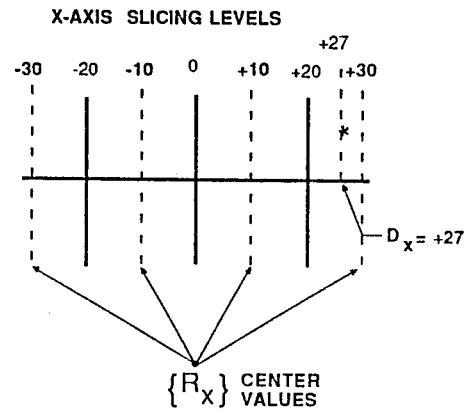

In both the "one-dimensional" embodiment of detector 34 shown in FIG. 8 and the "two-dimensional" embodiment shown in FIG. 9, the detector makes an initial estimation of the probably zone for each received input signal point, i.e. the probable phase and amplitude state. In the "one-dimensional" embodiment, the detector makes this determination for each input signal point by independently processing the x and y (or I and Q) components of the received signal points in slicing logic 56 and 58, respectively. In such a process each one-dimensional zone reduces to an open-ended band or region as shown in FIG. 10a and FIG. 10b. Functionally the process makes a decision between which boundaries a received signal point is located and outputs the value of the center of that band $(R_x, R_y)$. As shown in FIG. 10a and 10b, this is dione for each axial component, $D_x$ and $D_y$, of the received signal. The net effect of this two-step process is equivalent to creating two-dimensional zones.

One-dimensional processing can be implemented using either commercial logic devices or memory devices. In the memory approach, each signal component value $D_x$ and $D_y$ acts as an address to access a corresponding memory device 56 and 58. Each memory device contains information that defines one dimension of the zone for the particular modulation format selected. More particularly, each ROM memory bank for each axis contains two binary words for each possible received signal point along that axis for the associated modulation format: one word defining the center of an associated zone, $R_x$ or $R_y$, (generated on paths 67 and 68) and the other word (generated on paths 69 and 70) being the data output assignment, $A_x$ or $A_y$, for that one-dimensional component. Using the example shown in FIG. 10a as the memory address value of $D_y$, any $D_y$ address between 0 and +20 results in an $R_y$ center value of +10 which is outputted as an 8-bit word on path 68. $D_y$ addresses above +20 result in a +30 value outputted the same way. Similarly, $D_y$ addresses between 0 to −20 result in an $R_y$ value of −10, and less than −20 result in a −30 $R_y$ value. The same type of process is performed for the x axis. If, for example, the input signal point is $(D_x, D_y) = (+27, +13)$, the output from ROM's 56 and 58 would be $(R_x, R_y) = (+30, +10)$. [The (+30, +10) values are obviously not stored in memory as decimal values but as binary numbers. In the one embodiment shown in FIG. 8, two 8-bit bytes $(R_x, R_y)$.]

In addition, a second table representing $A_x$ and $A_y$ is stored in ROM's 56 and 58, respectively, with corresponding $D_x$ and $D_y$ addresses. Usually this secondary data is simply a 1 to 3-bit truncated version of the reference values $(R_x, R_y)$. Each ROM device 56 and 58 outputs the data assignment on paths 69 and 70 to form a version of the output data value for each two-dimensional zone. Since by design, the zones correspond to possible transmitted phase-amplitude states, the zone assignments correspond to the original data applied to a corresponding transmitter (not shown). (Alternatively, this secondary table could be developed by equivalent logic circuits).

The remainder of the processing in the one-dimensional detector shown in FIG. 8 implements the error algorithm described below. Briefly, the detector calculates the x and y error components $(E_x, E_y)$ by subtracting the components of the reference vector $\vec{R}$ from the signal components $(D_x, D_y)$. The detector also computes the vector dot and cross products using digital multipliers (71-74) and adders and subtracters (61-64) by operating on the error components $(E_x, E_y)$ and the reference components $(R_x, R_y)$. This process develops the phase- and gain-errors, since the dot product represents the gain-error signal and the cross product represents the phase-error signal.

For each different modulation format having a unique constellation pattern, a different pattern of boundaries, centers, and data assignments is stored in memories 56 and 58. To accommodate other such formats, the memories may be expanded in increments called banks, each one containing the complete pattern for each one of the constellation patterns desired. The pattern select control signal on path 54 determines which one of look-up tables in each of the ROMs 56 and 58 is selected by the address signals on lines 31A and 31B. By selecting a specific bank (via path 54), the combined demodulator is optimized for that specific constellation format. The demodulator is thus programmable and applicable to many constellation formats with no change to the hardware.

Two-Dimensional Processing

In the embodiment shown in FIG. 9, the zone assignment process is performd on a "two-dimensional basis" which provides two key improvements over the one-dimensional processing. One-dimensional processing (as in FIG. 8) is useful primarily for rectilinear constellation patterns, whereas two-dimensional procesing allows arbitrarily shaped constellation patterns and boundaries and is more general in its applicability because it operates on two-dimensional information. Also, the processing speed is greatly increased enabling real-time operation for very high data rates. In this embodiment the input signal components $(D_x, D_y)$ are processed together by forming a new complex number which is processed directly to produce phase- and gain-error signals and data assignment values $(A_x, A_y)$. As shown in FIG. 10C, for a $(+27, +13)$ input signal point, the reference value $(R_x, R_y)$ associated therewith is determinable and could be retrieved from memory and outputted. However, there is no need to output $(R_x, R_y)$ as $(+30, +10)$ as is done in one-dimensional processing. For a finite binary representation of $(D_x, D_y)$, there are only a finite number of signal components, and the phase and amplitude error values for every possible $(D_x, D_y)$ signal point can be stored in a look-up table device such as ROM 290. The error values are calculated using the error algorithm described herein and then "burned" into memory prior to receiving any modulated data signals. Using the received components $(D_x, D_y)$ on paths 31A and 31B as a single look-up table address, the error values are outputted on paths 314 and 315 from the appropriate bank of memory 301 through 306 which correspond to particular modulation patterns. This greatly simplifies the real-time processing/decoding of the received data from a complex algorithm process to a much simpler look-up table process. The table look-up process delivers the same error output signals as are produced by the algorithm process, except at a much faster rate. Similarly the data assignment values $(A_x, A_y)$ can be programmed into memory, just like the error values to correspond to particular $(D_x, D_y)$ addresses and then outputted as a single 6-bit word on path 311. To handle different constellation patterns, ROM 290 has stored in separate "banks" of memory (301-306) pluralities of associated data assignments and gain- and phase-error tables for a plurality of two-dimensional constellation patterns. The selection of the particular bank of memory is handled the same way as explained above using the same pattern select control signal on path 54. When implemented as shown with a single ROM device, the 3-bit pattern select 54, the 6-bit $D_x$ 31A and the 6-bit $D_y$ 31B form a single 15-bit address word to access the proper memory location in the correct memory bank. Alternatively, numerous memory devices could be used with appropriate logic circuitry to route the $(D_x, D_y)$ address to the proper memory device for the modulation format desired.

Error Algorithm

The algorithm calculates the error of a particular received signal point in two steps. The zone containing the input signal point is identified as described above, and then the phase- and gain-error components of the error vector are determined. In the zone identification process the one-dimensional and two-dimensional process are slightly different. FIG. 6 pictorially illustrates the process for developing error signals. In this example of a 4-PSK constellation pattern, a received input signal point D has a corresponding vector $\vec{D}$ with a phase angle $\alpha$ and amplitude $|D|$. The displacement of the signal point D from the location of the corresponding reference signal point R within the zone is defined herein as "error". In FIG. 6 vector $\vec{G}_e$ corresponds to the gain error vector, whose magnitude is proportional to the magnitude of the vector dot product of the reference and error vectors $\vec{R}$ and $\vec{E}$. Similarly the vector $\vec{\Phi}_e$ corresponds to the phase-error vector which is proportional to the amplitude of the vector cross product of the vectors $\vec{R}$ and $\vec{E}$. More particularly, the magnitude of the phase-error vector $\Phi_e$ may be represented as:

$$|\Phi_e| = \frac{(R_x)(E_y) - (R_y)(E_x)}{R^2} \quad (1)$$

This may also be represented as:

$$|\Phi_e| = \frac{(R_x)(D_y) - (R_y)(D_x)}{R^2} \quad (2)$$

where $D_x$ and $D_y$ are the x and y components of the received data point vector $\vec{D}$. $R_x$ and $R_y$ are the x and y components of the reference vector $\vec{R}$ which is associated with the zone containing the received signal point; and $E_x$ and $E_y$ are the x and y components of the error vector $\vec{E}$ that are associated with the received data point:

$$E_x = D_x - R_x \quad (3)$$

and $$E_y = D_y - R_y \quad (4)$$

Similarly the magnitude of the gain error $\vec{G}$ is representable as:

$$|G| = \frac{(R_x)(E_x) + (R_y)(E_y)}{R^2} \quad (5)$$

One-dimensional Implementation

Figure 7:
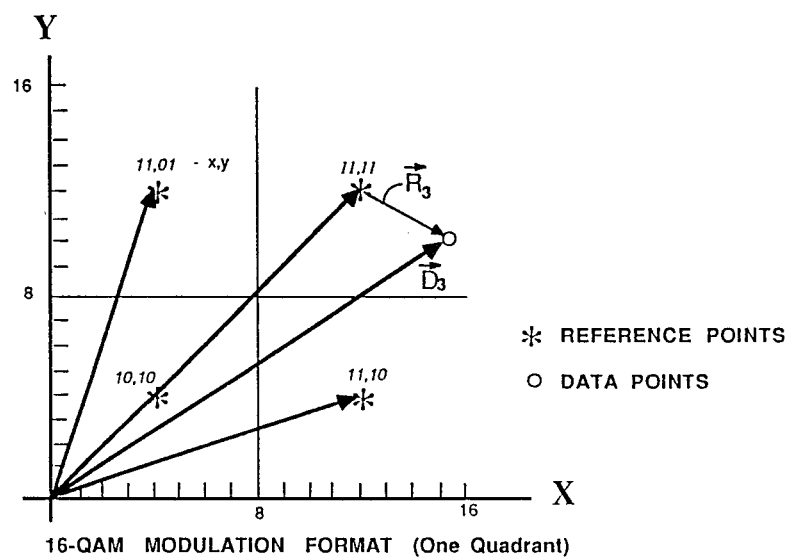
FIG. 7 is an enlarged graphic representation of a measurement pattern defining rows and columns in the first quadrant of the 16-QAM modulation format and showing reference and input data vectors $\overline{R}$ and $\overline{D}$ for the reference (correct) data points and received signal positions which are represented by the symbols * and o, respectively.

The one-dimensional processor implements both parts of the algorithm in a rather transparent way. Considering the example in FIG. 7 depicting signal points from a 16-QAM modulation format, each signal component has only 32 possible values or ROM addresses (instead of the 256 possible values for the 8-bit binary signal of FIG. 8). The 16-QAM look-up table in each ROM (56 and 58) contains four different groups of words, each group containing 8 identical pairs of binary words—there are 8 possible received data vlaues along each axis of the zone. There is a different pair of words for each of the 4 possible zones for 16-QAM (only two such zones or levels on each axis being shown in FIG. 7). Thus, considering two dimensions for each zone, there are 64 possible positions each having identical pairs of words.

The input signal components shown in FIG. 8 on paths 31A and 31B correspond to the ($D_x$, $D_y$) signal components in equations (2)–(4). ($D_x$, $D_y$) directly address ROMs 56 and 58 in FIG. 8 to produce 3-bit $A_x$ and $A_y$ data output signals on paths 69 and 70 which define the correct output data assignment for the zone containing the received signal point ($D_3$ in this example, see FIG. 7). These input signal addresses on 31 also cause the ROMs to produce 8-bit binary words on paths 67 and 68 which define the x and y coordinates of the reference point $R_3$ that are associated with the zone of the received signal point ($D_3$). These reference signals correspond to $r_x$ and $R_y$ in equations (3) and (4). Binary adders 61 and 62 subtract ($D_x$, $D_y$) from the ROM's output to produce error signals $E_x$ and $E_y$ defined by equations (3) and (4). These error signals may be either positive or negative.

Multipliers 71 and 74 and adder 64 calculate the gain error as shown in equation (5). Note that the euqations in the error algorithm shown above are "normalized" using $|R^2|$. The other two multipliers, 72 and 73, and adder/subtractor 63 calculate the phase error as shown in equation (1). The D/A converters, 44 and 48, in FIG. 2 translate the 8-bit binary words (corresponding to the phase and gain-errors on paths 42 and 40) to associated analog voltages. After processing in compensation circuits, the signals 46 and 50, are of appropriate polarity and value for driving the voltage controlled oscillator 24 and the level control circuit 16 in the proper direction.

Two-Dimensional Implementation

In the two-dimensional implementation shown in FIG. 9, the same basic algorithm is indirectly used. As explained above ROM 290 in FIG. 9 has in memory all possible phase errors, gain errors, and data value assignments stored under the addresses formed from all received data point positions. In a slow speed computer based implementation of this demodulator these processes are all performed in software routines, and the look-up table is simply placed in the computer memory.

Figure 11:
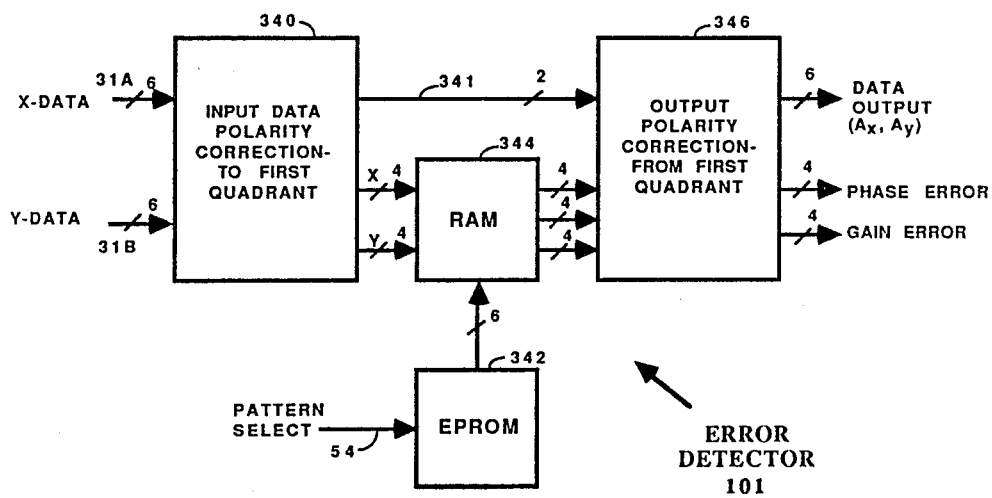
FIG. 11 is a block diagram of very high speed capable embodiment of a universal error detector 34.

Numerous implementations of device 290 exist depending upon the speed desired. There is a basic design tradeoff between speed of operation and the number of bits that can be processed in real time; the higher the signal data rate, the fewer number of bits that can be processed. For moderate speeds, such as 5 mega samples per second (MSPS), or below, a single large inexpensive memory device (e.g. a programmable memory integrated circuit—PROM) is sufficiently fast. For higher speed, approaching 20 MSPS, several special high speed memories are required. For the very fastest operation, small very high-speed ECL technology memory devices may be used. The architecture that is shown in FIG. 11 and related FIGS. 14 through 17, is an architecture that uses the smallest and highest speed read/write (RAM) memory. With existing technology devices, 7 nanosecond access times are available, and operating speeds in excess of 90 megasymbol per second are possible.

Although the one-dimensional processor, shown in FIG. 8, operates in real time by calculating a phase-error and a gain-error signal for each received signal point, it requires considerable hardware and integrated circuit surface area. And, such a processor has speed limitations—it is doubtful that it could process symbol rates greater than 20 megasymbols per second with present day technology. (Each data point in a constellation represents a "symbol.")

Two-Dimensional Processor Concept—Detailed Description

In a moderated-speed embodiment of this invention, the two-dimensional processor, shown in FIG. 11, uses a memory device having a large addressable memory. If higher speed operation is required with few components, a more complex processor could be used. This moderate speed processor description includes an explanation of: one-quadrant look-up table; polarity correction of the table output; and low resolution data issues which include the detailed issue of shifting the low resolution input data for some modulation formats, such as the quadrature partial response system formats, and include constellation points that are positioned on the coordinate system axes. A detailed circuit design is discussed as one implementation of the high-speed demodulator. The last discussion of the processing describes the problem and solution for incorrect or false-lock orientations of the input constellation pattern with respect to the demodulator zone pattern.

The following description aids in understanding the issues associated with using fewer data bits (which gives lower resolution) in the memory address look-up table. It is also an example of how the basic two-dimensional approach can be implemented, although it is not generally necessary to have lower resolution nor is it necessary to use only one quadrant stored in memory.

Referring now to FIG. 9, the two-dimensional processor embodimentcomprises ROM 290 having 6 different banks of memory 301–306, each memory bank containing a look-up table for a different constellation pattern, e.g., bank 304 for 16-QAM formats, etc. Memory bank 304 is subdivided into three different sub-banks of memory containing a value for the output data assignment $A_x$, $A_y$, a value for $G_e$, and a value for $\Phi_e$. The digital signal processing reduces to a table look up of data output values and error values which are read out of the selected look-up tables during each symbol interval as the appropriate results for the received input signal. The contents of memory bank 304 for the first quadrant of a 16-QAM signal format are accessed in response to a prescribed pattern select signal on path 54 along with a particular combination of first quadrant input signal address bits such as (00100) and (00010). The binary words (00100) and (00010) representing ($D_x$, $D_y$) designate the arbitrarily labeled cell 308 in the first quadrant of FIG. 12. When only 5-bit bytes are used along each axis to represent all signal points within the first quadrant, a multitude of (8-bit) signal points are represented by a single 5-bit address pair. For the 16-QAM format ROM 290 generates on output path 311 the x and y components of a data assignment $A_x$, $A_y$ from memory sub-bank 304A. ROM 290 also selects a binary value of $G_e$ from memory (sub-bank 304B) and outputs it on path 314, and selects the binary value of $\Phi_e$ from memory (sub-bank 304C) and outputs it on path 315. Since this is only one quadrant of information, further processing or more memory must be used for complete operation over four quadrants.

With this memory approach a demodulator design may be upgraded as new and diverse modulation formats come into use. For example, if a communication manufacturer develops a modulation format using diamond shaped boundaries, for whatever reason, then it is only necessary to reprogram memory 290 in FIG. 9 to implement these new modulation format boundaries. Even circularly shaped boundaries could be implemented with this detector in FIG. 9.

High Speed and Low Resolution Implementation

Although there are advantages to operating error detector 34 at very high-speed data rates, large size (i.e., high capacity) memories are required for high resolution and complex modulation formats. As stated above there is a tradeoff between processing speed and resolution; high capacity memory devices and very high-speed operation are not generally compatible. An alternate embodiment of error detector 34 operating at very high speeds but having the effect of large memory capacity is illustrated generally in FIG. 11. Error detector 101 comprises a data polarity correction circuit 340, a larger and slower memory such as an electronically programmable read only memory (EPROM 342), a high-speed random access memory, RAM 344 [which may be an emitter-coupled logic (ECL)] and an error polarity correction circuit 346. Virtually any large slow-speed memory device can be used for 342. Error detector 101 can be implemented with standard off-the-shelf emitter coupled logic components. For example, RAM access times as low as 7 ns allow opeation on symbol rates in the range of 70 to 100 megasymbols per second. By using the larger, slower and easily programmable memory (EPROM 342) for storage, new modulation formats are easily reprogrammed. The look-up tables for all of the constellation patterns are stored in EPROM 342. But, in this approach only the first quadrant needs to be stored so that smaller memory devices can be used. The pattern select signal on path 54 causes EPROM 342 to transfer a particular look-up table for the selected modulation format (typically in a few ms) into the much higher speed RAM 344. Correction circuit 340 translates all ($D_x$, $D_y$) input signals so that they appear in the first quadrant. The translation process makes the polarity sign of all ($D_x$, $D_y$) data positive so that the sign bit need not be processed. This reduces the number of bits processed (and the resolution) by two. Polarity correction circuit 346 translates the resulting output data and error signals from the first quadrant to the appropriate quadrant for the actual ($D_x$, $D_y$) input signal addresses.

The process of translating two-dimensional information on an x, y grid from any quadrant to the first quadrant can be a complex process. When the ($D_x$, $D_y$) input signals being processed have low resolution, (e.g., are represented by 5-bit bytes) each input signal represents a finite range of signal values rather than single value or point. Reducing the number of bits increases the number of signal levels being represented by a single value/byte. As the size of the signal boxes approach the size of the modulation format zones, such granularity must be taken into account in the detector processing. Two processing steps that are performed are the cross and dot product processing and the quadrant translation processing. The cross and dot product equations used to create the memory table values are adapted to low resolution processing by developing the errors from the reference point to the center of each resolution element. The basic calculations are performed with high resolution, however the output is truncated and rounded in accordance with the desired output resolution (typically 4 bits). The cross and dot products are also divided by the radius distance to the point in question from the origin squared. This removes the tendency of the normal dot and cross product generated errors to be large for large radii and small for small radii. Thus corrected, the output errors require less resolution for good sensitivity.

Figure 12:
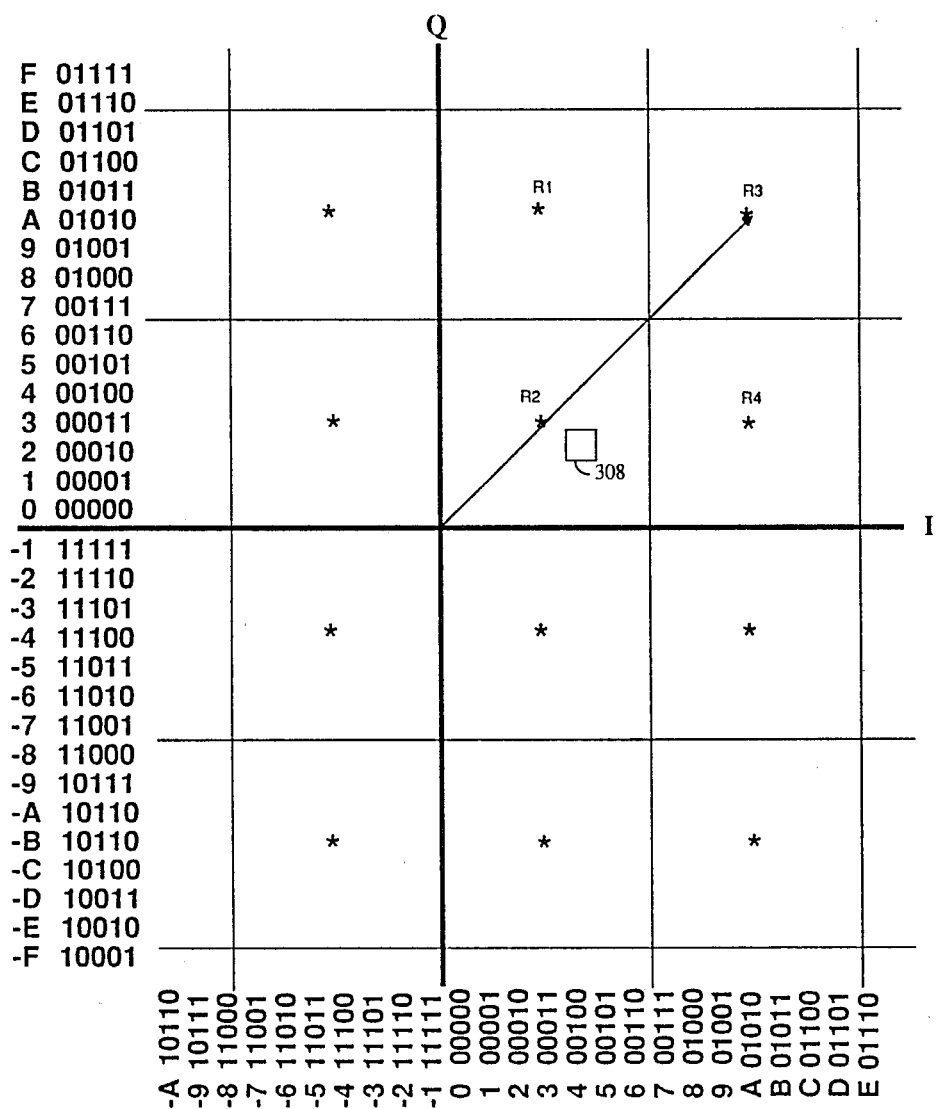
FIG. 12 is a graphic representation of a 16-QAM modulation format overlayed on a zone pattern defining rows and columns and illustrating how the binary numbers could represent the two-dimensional modulation space.
Figure 13:
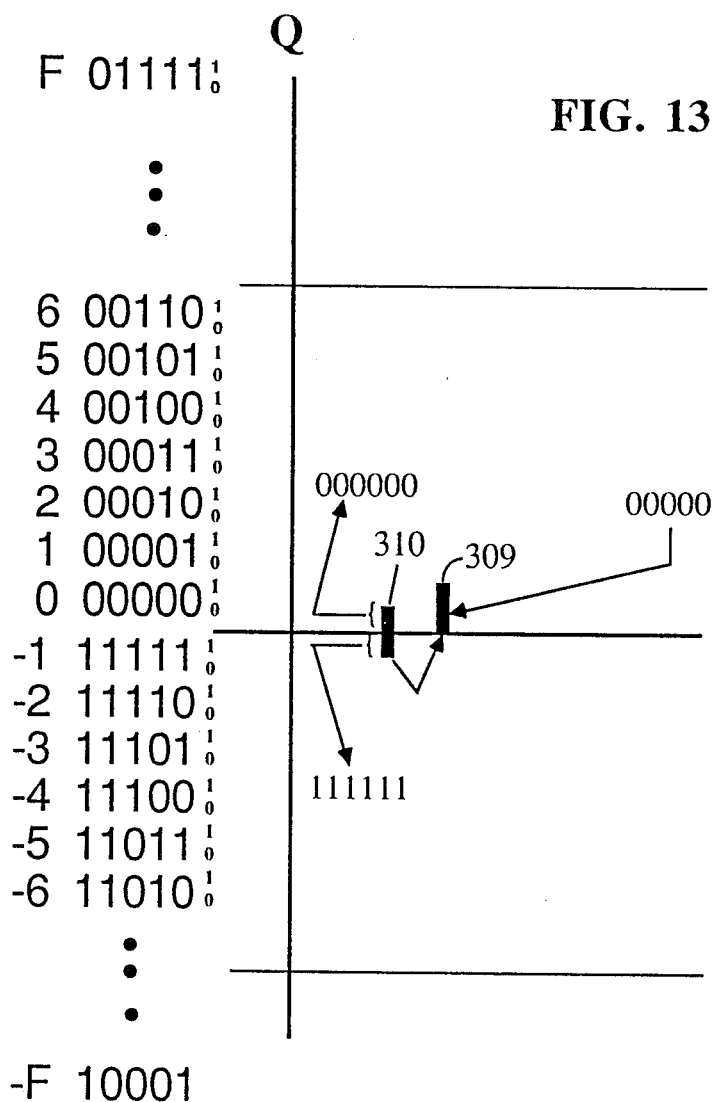
FIG. 13 is an expanded portion of one quadrant of the graphic representation shown in FIG. 12 which illustrates a shift of the x and y axes for partial response modulation formats to increase accuracy when operating with minimal resolution of input data.

The quadrant translation process makes all values positive by multiplying negative values by a ($-1$), i.e. each negative binary value is two's-complemented. For modulation formats having zone boundaries on the major x and y axes, (i.e., QPSK, 8-PSK, 16-QAM and 64-QAM), the best sign translation of the received input signal ($D_x$, $D_y$) is to truncate the binary value to the desired resolution and then to invert this truncated number (one's-complement). FIGS. 12 and 13 can be studied to see these effects. This produces the same result as two's complementing a higher resolution number and then truncating, but uses much less circuitry.

For the special modulation formats that have reference points on the major axes, (such as 9-QPR or 49-QPR) a second technique is used since both the x and y axes form the border between adjacent cells/resolution elements. The zone around the axis, both positive and negative, must be in one resolution element, e.g., cell 310 in FIG. 13. To modify the value of the received signal point so that the zone around zero has one value and equal to zero, the values are inverted (one's complemented) but with one additional bit of resolution. The result is then rounded using this additional bit. [Rounding in binary is the process of not changing a number's value if the lower resolution bit is zero and raising the number's value by one (adding one to the number) if the lower resolution bit is a one.] This derived number is used in the memory table address. The numbers within the table are obtained, as before, using the exact position of the centers of the resolution elements and the exact reference points, in a process with high precision arithmetic giving results that are then rounded to the lower resolution that is used as the output resolution. In FIG. 13 y-axis component values shown as cell 310 are processed and used in the memory look-up process as if they were cell 309. The consequence of this process is that modulation formats with constellation states which would logically have boundaries on the x, y axes can be processed using the low resolution memory. This detailed process is needed only in cases where low resolution is needed due to small memory size. The process of using one quadrant for memory storage and using symmetry about the x and y axes are only required for applications using small high-speed memories.

High Speed/Constellation Format Selection

In accordance with one aspect of this invention, error detector 101 shown generally in FIG. 11 is capable of operating at very high speeds by minimizing memory size requirements. Detector 101 shown in more detail in FIG. 14 comprises constellation pattern select unit 103, control circuit 106, ROM circuit 107, input-data processing circuit 109, a plurality of RAM's 111, and polarity correction circuit 113. The pattern select circuit 103 is a very simple device that allows the constellation pattern to be manually set to whatever pattern is desired. The function is shown pictorially as a select switch 115 in the pattern select 103 which when operated causes ROM 107 to select a particular constellation pattern from memory. A push button switch 117 on the unit 103 is actuated for causing the selected look-up table to be loaded from ROM 107 into RAM 111. The pattern select unit 103 also produces a binary 1 on path 121 whenever the detector 101 is selected to operate with respect to a partial response constellation pattern. (A more detailed explanation of the pattern select circuit 103 follows in conjunction with the discussion of FIG. 15.)

Data Transfer

Figure 14:
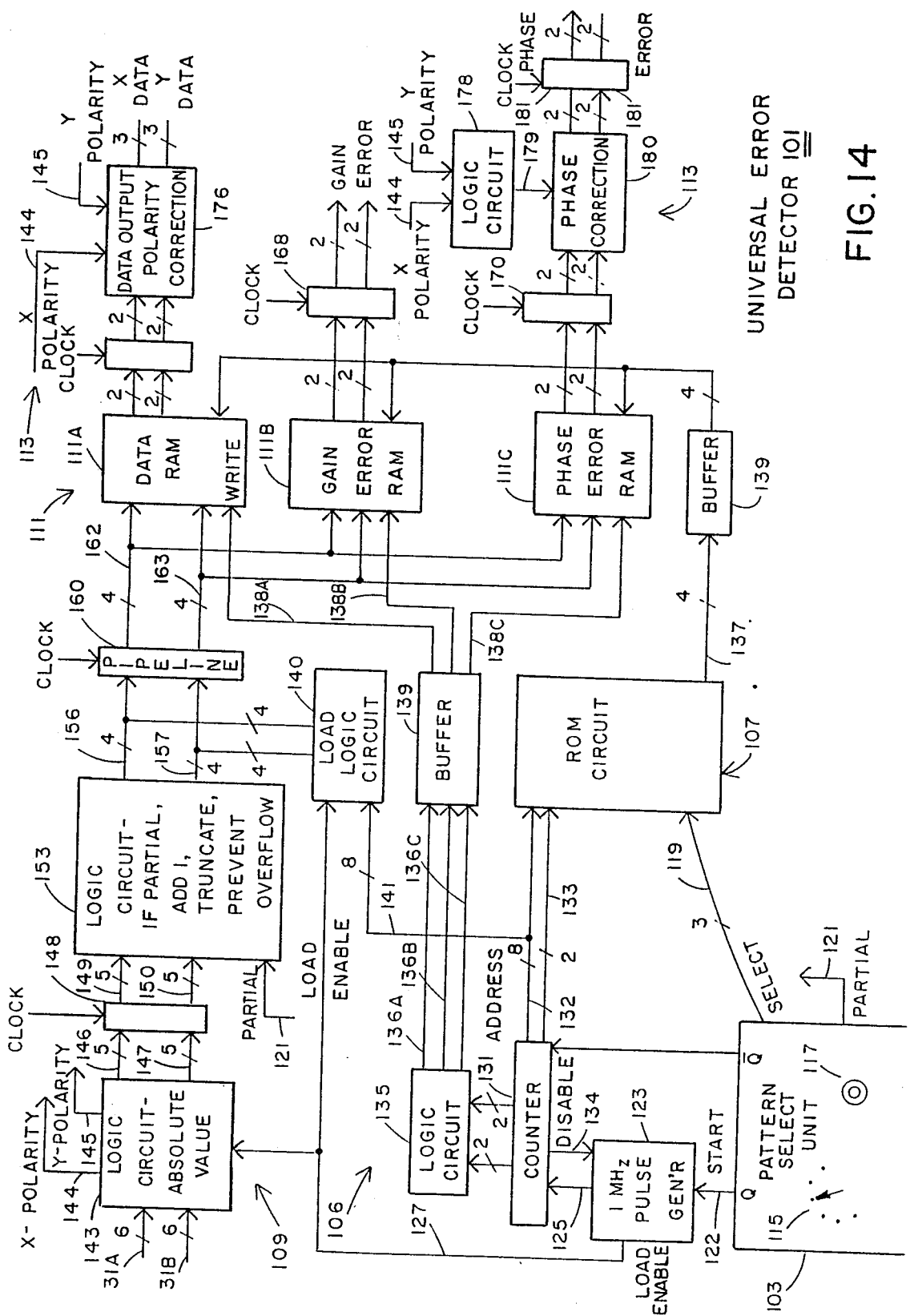
FIG. 14 is a schematic block diagram of an embodiment of this invention which can operate at very high speed and in which processing of input data is performed with respect to a single quadrant of a constellation pattern, as shown in less detail in FIG. 11.

The following is a description of a rather standard memory-data transfer technique. In FIG. 14, the selected portion of memory in ROM 107, containing all the information for the selected constellation format (i.e. the look-up tables), is transferred into the high speed memory RAM's 111A, 111B, and 111C. Thereafter the detector demodulates the input signals for the format selected. The data transfer circuitry primarily contains: a self-stopping counter 131 that generates a sequence of memory addresses; a large memory circuit ROM 107; several buffer registers 139; a pulse generator 123 creating WRITE pulses (transmitted through logic circuit 135 and buffer 139); and load logic circuit 140 which ensures that the high speed memory address comes from the transfer counter during the loading operation.

In FIG. 14 ROM 107 has dedicated banks of memory that store output data value assignments for each zone in the first quadrant of each constellation pattern. ROM 107 also has banks of memory storing values of the phase and gain errors, $\Phi_e$ and $G_e$, for each input data resolution element/point in each zone for each constellation pattern programmed into detector 101. ROM 107 is responsive to a digital control byte on path 119 for enabling access to output data values, gain error and phase error memory banks thereof that are associated with the particular constellation pattern selected by switch 115.

Control circuit 106 comprises a pulse generator 123, a counter circuit 131, and logic circuits 135 and 140. Generator 123 is responsive to a start pulse from the pattern select unit 103 for generating a train of timing pulses on output path 125. Counter 131 counts the timing pulses to produce 8-bit address bytes on signal paths 132 and 133 that are applied to ROM 107. The address words on path 132 are also applied on paths 141 to logic circuit 140 and thus to the RAM's 111 via pipeline circuits 160 and paths 162 and 163. (Pipeline circuits 160 et al. are parallel flip-flops needed to retime data streams in parallel bus circuits. Such circuits realign the timing of the input data bits which may experience differing amounts of processing or propagation delays in the conventional manner for high speed digital processing.) Pulse generator 123 also produces an enable output signal on path 127 that is continuously high when the pulse generator is operating for enabling logic circuit 140 so that the RAM's 111 are addressed by the count on paths 141.

ROM 107 outputs the contents of the look-up tables addressed onto paths 137 for loading into RAMS 111A, 111B, and 111C. Additionally, logic circuit 135 is responsive to the two MSB's (most significant bits) and the two LSB's (least significant bits) in the contents of counter 131 for producing trains of pulses at different times on the paths 136A, 136B, and 136C for successively enabling associated RAM's 111A, 111B, and 111C. This causes the RAM's 111A, 111B, and 111C to write the values of output data, gain error, and phase error from the addressed 10 bit (1024) memory locations in ROM 107 into memory locations in RAM's 111A, 111B, and 111C, respectively, each having corresponding 8-bit LSB's addresses (256). These operations may be accomplished by having the counter 131 first cycle through an address count such as 256 on paths 132 while enabling only RAM 111A with pulses on path 138A for writing a table of correct values of data from addressed 10-bit memory locations in ROM 107 into corresponding 8-bit memory locations of the same 8-bit address in only RAM 111A. After the counter 131 has stepped through a first count of 256, logic circuit 135 produces a train of pulses on only path 136B and 138B for successively enabling only RAM 111B. At this time there is also a bit change on one of the paths 133 which causes a bank of ROM memory to then be addressed by the 8-bit count on paths 132. As the counter 131 steps through a second count of 256 on paths 132, RAM 111B writes a train of values of gain error from addressed memory locations in ROM 107 into corresponding memory locations of the same 8-bit address in only RAM 111B. Following this second count of 256, logic circuit 135 produces a train of output pulses on only path 136C which enable only RAM 111C. At this time another bit change on the paths 133 causes a third bank of ROM memory to be addressed by the 8-bit count on paths 132. During the subsequent third count of 256 on paths 132 the RAM 111C writes the train of values of phase error from addressed memory locations in ROM 107 into corresponding 8-bit memory locations of the same 8-bit address in only RAM 111C. After this third count of 256, the counter 131 produces a signal on path 134 that turns OFF the pulse generator 123.

Figure 15:
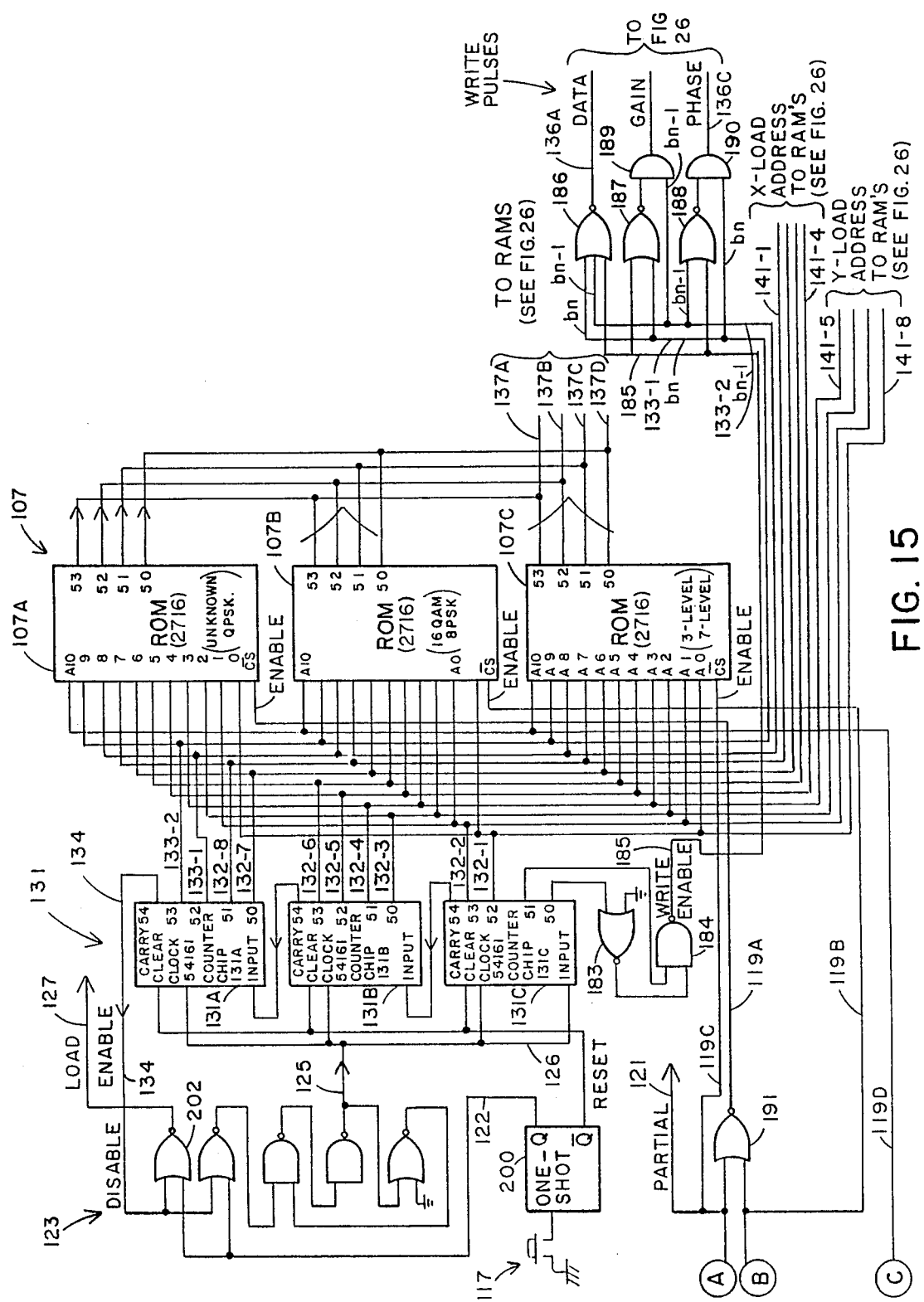
FIG. 15 is a detailed schematic circuit and block diagram of pattern select unit 103, control circuit 106 and ROM memory circuit 107 in the universal error detector 101 shown in FIG. 14.
Figure 16:
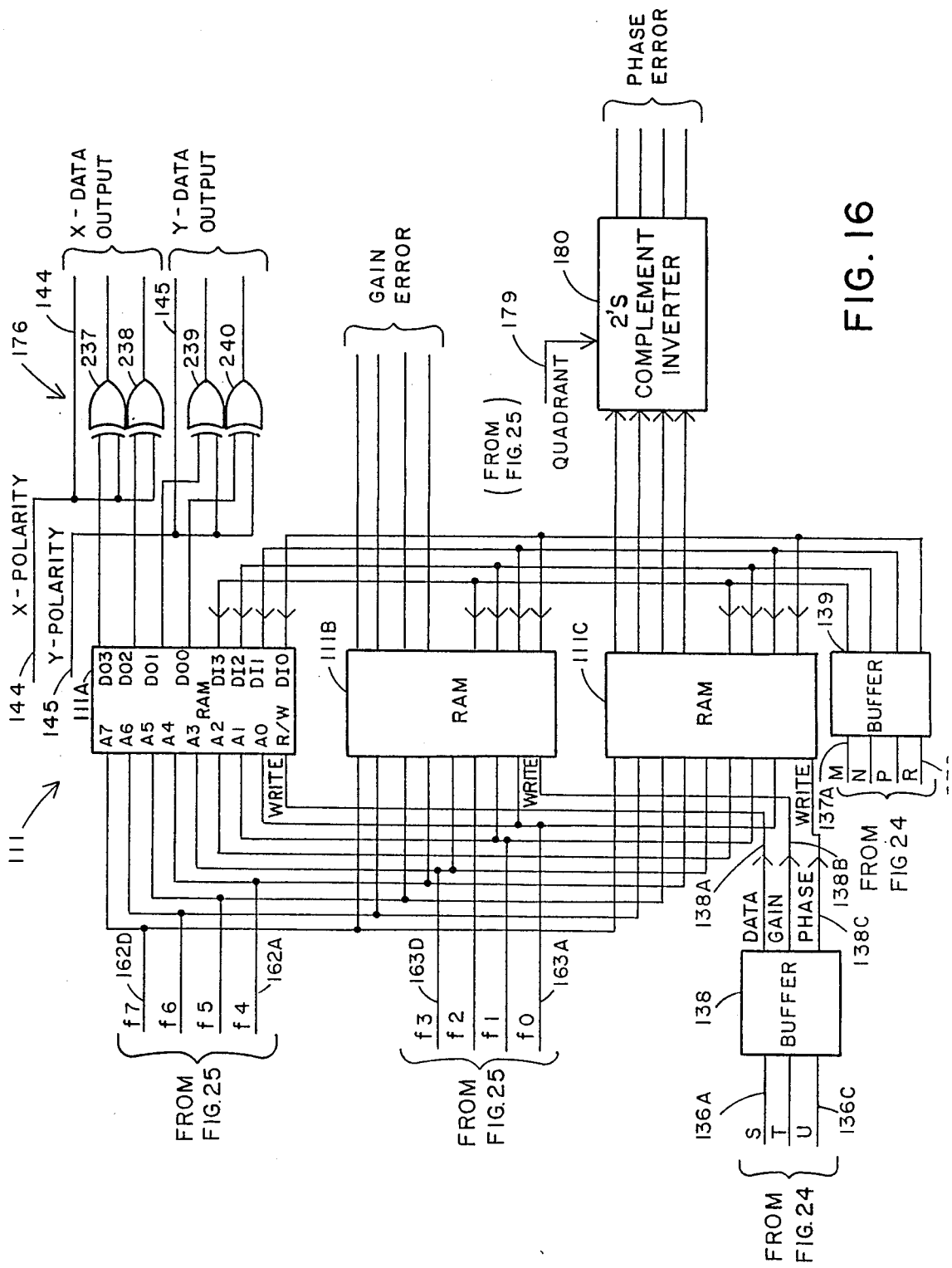
FIG. 16 is a detailed schematic circuit and block diagram of RAM memory circuit 111 and polarity correction circuit 113 in the output of the detector 101 in FIG. 14.

FIG. 15 illustrates more detail of the memory data transfer circuitry. ROM 107 comprises three different ROM chips 107A, 107B and 107C. Each of the ROM's stores all of the possible correct data assignment values, amplitude-error values, and phase-error values (for example for 2 out of 6 different constellation patterns). More specifically, ROM 107A stores values for a QPSK and an unknown constellation pattern type whereas ROM 107B stores values for the 16-QAM and 8-PSK constellation patterns. ROM 107C is dedicated to quadrature partial response type signals and stores values for the 3- and 7-level partial response constellation patterns.

To appreciate the functional operation of the data signal transfer, the following describes QPSK information being loaded from ROM 107A to RAM 111. Counter 131 comprises a plurality of series connected 4-bit hexidecimal counter chips 131A, 131B and 131C, each of which has 4 count type output paths 50-54 and an output carry path (designated as "CARRY"). The logic circuit shown in FIG. 14 as element 135 comprises NOR gate 183 and NAND gate 184 that operate on the 2 LSB's from counter chip 131C for producing one write pulse on path 185 for every 4 timing pulses from pulse generator 123. Logic circuit 135 further comprises NOR gates 186–188 and AND gates 189–190 that combine the write pulses on path 185 with the 2 MSB's on paths 133-1 and 133-2 for sequentially steering trains of write pulses 185 onto paths 136A, B and C as DATA, GAIN and PHASE write pulses, respectively.

More specifically there is a train of write pulses on path 136A (that is connected to RAM 111A) when paths 133-1 and 133-2 are both low. Similarly, there is a train of write pulses on only path 136B when only path 133-1 is high. Also, there is a train of write pulses on only path 136C when only path 133-2 is high. These three trains of write pulses on paths 136A, B and C cause associated RAM'S 111A, 111B and 111C to read different groups of the contents of ROM 107A that are successively presented on paths 137A-137D as is described more fully hereinafter.

Each of the programmable ROM chips used in this implementation is sufficient to store two complete constellation tables and is responsive to the same binary control signal on pin A10 that selects which one of the two areas of memory thereof and associated constellation pattern will be accessed by address signals on paths 132-1 to 132-8 and 133-1 and 133-2 of the counter chips. Each of the ROM chips is enabled by a different unique associated control signal on the chip select pin $\overline{CS}$ so that no two of the ROM chips are enabled at the same time. The output terminals of the 3 ROM chips are tied to a common set of paths 137A-137D which are connected through buffer 139 (see FIG. 16) to the load-input paths DI0-DI4 of each of the RAM's.

Operation of selector switch 115 on pattern select unit 103 in FIG. 14 produces a 3-bit digital signal on paths A, B, and C in FIG. 15 which designates the selected one of the six possible constellation patterns that are available in this embodiment of the detector 101 in accordance with the following table.

| MOD FORMAT | PATHS | | |
|---|---|---|---|
| | A | B | C |
| UNKNOWN | 0 | 0 | 0 |
| QPSK | 0 | 0 | 1 |
| 16-QAM | 0 | 1 | 0 |
| 8-PSK | 0 | 1 | 1 |
| 3-QPRS | 1 | 0 | 0 |
| 7-QPRS | 1 | 0 | 1 |

The A bit is high for only partial response patterns whereas the B bit is high for only the 16-QAM and 8-PSK patterns. The A and B bits are therefore inverted and applied to the chip select pins $\overline{CS}$ of RAM's 107C and 107B, respectively. The A bit is also coupled onto path 121 and used in the circuits shown in FIG. 17, when the system is to operate in a partial response mode. Since both the A and the B bits are low for the unknown and QPSK patterns, the A and B bits are applied to NOR gate 191, then inverted for producing a control-enable signal on path 119A that is connected to the $\overline{CS}$ pin of ROM 107A. The LSB C bit selects one of the two constellation patterns (shown in the above table) and the ROM's. The C bit is the common control signal that is applied to pin A10 of each of the three ROM chips to designate which half thereof is to be accessed. Note that the zone pattern referred to as the "unknown constellation pattern" is the one used if the received modulation type is totally unknown. This so-called "unknown pattern" is the same as the 49-QPR pattern since many different formats can fit into the 49-QPR zone pattern. Unknown formats can thus be tracked until a further identification can be made by the operator or processor after which the specific type can be identified for better tracking and detecting.

In FIG. 15 pattern select 103 also comprises a one-shot multivibrator 200 which is actuated by operating switch 117. The $\overline{Q}$ output of one-shot 200 resets each of the ocunter chips 131A-C. At the end of the one-shot timing pulse, the counters and pulse generators 123 begin sequential addressing the ROM memories for the data transfer. The pulse generator may, by way of example, have a pulse repetition frequency of 1 megabits per second, which is 4 times the rate at which the ROM chips are addressed. NOR gate 202 of the pulse generator produces an enable signal ("ENABLE") on path 127 which is continuously high during generation of timing pulses on path 125 for enabling the banks of AND gates 207 and 208 (in FIG. 17) that are used to load the associated RAM's. The ENABLE signal on path 127 also disables signal data during the load time at 216-220 and 216'-220'. AND gate banks 207 and 208 in FIG. 17 comprise logic circuit 140 in FIG. 14. The address bits on output paths 141-1 to 141-4 and paths 141-5 to 141-8 of the counter 131 of FIG. 15 (i.e., paths 132) are applied in FIG. 17 to the other inputs of AND gates of the banks 208 and 207, respectively. The signal on path 134 goes high when counter chip 131A overflows thus disabling gate 202, stopping the pulse generator 123, and removing the load enable on path 127.

In FIG. 15 each of the counter chip 131 is clocked by each timing pulse on path 125. The counter chip first count from 0 to 255 (a first count of 256) on the 8 paths 132 for sequentially addressing memory locations of a first group thereof in ROM chip 107A, for example. This causes ROM 107A to make available on paths 137A-D associated correct values of data assignments $(A_x, A_y)$, $\Phi_e$, and $G_e$ for the selected QSK constellation pattern, for example, which are connected through buffer 139 to the load input pins DIO-DI3 of each of the RAM's in FIG. 16. These same 8-bit address words on paths 132 are coupled on paths 141 through banks 207 and 208 of AND gates in FIG. 17 to the address inputs of each of the three RAM's. During this first count of 256 the binary signals on paths 133-1 and 133-2 are both low. Since the WRITE control input (R/W) to only RAM 111A is active (because of the DATA WRITE pulses on path 138A during the first count of 256 on paths 132), then only RAM 111A is loaded with the contents of associated memory locations in the data ROM chip 107A. The counter chips then count from 256-511 on paths 132 and 133 (i.e., a second count of 256 on paths 132). Since the "GAIN ERROR" control or write pulses on path 138B enable only the second RAM, 111B, during this second count of 256, only RAM 111B is loaded with the contents of associated memory locations in ROM chip 107A. Finally, the counter 131 counts from 512 to 767 on paths 132 and 133 (i.e., a third count of 256 on the 8 paths 132) in response to timing pulses from the pulse generator. Since now only RAM 111C is enabled by phase error write pulses on path 138C during generation of the third count of 256, the same 8-bit address on paths 132 address the 3 RAM's and cause the 8-bit memory locations in only RAM 111C to be loaded with values of phase error for the selected QPSK constellation pattern from ROM 107A. The counter then continues its count to 1023, addressing memory locations not used at this time. After the counter has cycled through the requisite count of 1023, for example, the signal on path 134 goes high for turning off the pulse generator.

Figure 17:
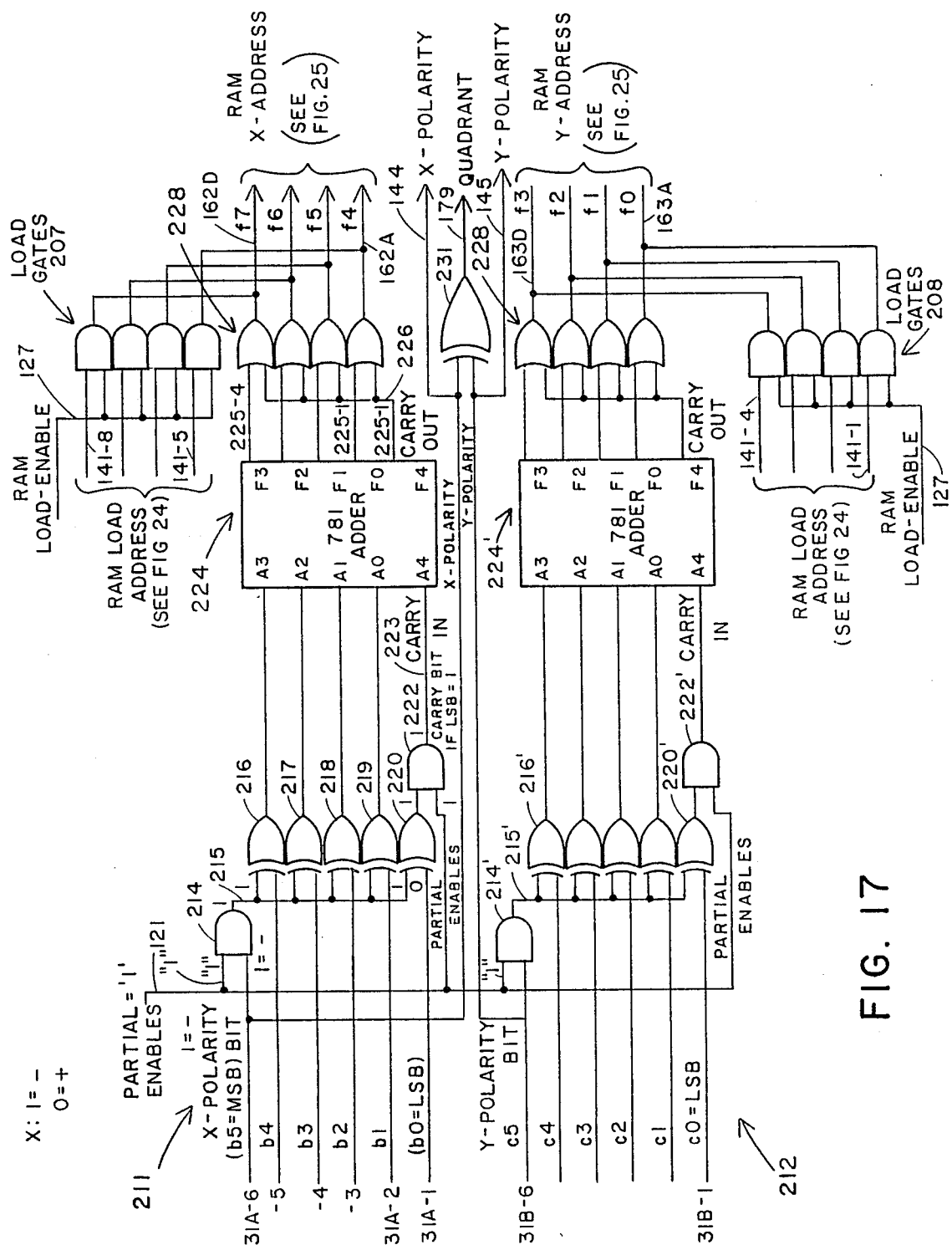
FIG. 17 is a detailed schematic circuit and block diagram of circuit 109 for processing input data in the universal error detector 101 embodiment of this invention in FIG. 14.

Stated differently, only the 8 output paths 132 of the counter, which designate the count of 0-256, are coupled on paths 141 to associated AND gates of the banks 207 and 208 thereof in FIG. 17. Since these gates were previously enabled by the output of the pulse generator on path 127, the 3 consecutive counts of 256 are applied on paths 162 and 163 to the x-and y-address inputs of all 3 of the RAM's. The trains of output data assignments, gain error and phase error write pulses on paths 138A, 138B and 138C are also successively applied to RAM's 111A, 111B and 111C, respectively, at this time. This causes RAM's 111A, 111B and 111C to be sequentially addressed during the first, second and third counts of 256 on paths 132 for loading then with the values of data assignment, amplitude error, and phase error from the particular ROM for the selected constellation pattern.

Quadrant Translation and Rounding

The $(D_x,D_y)$ input data is processed always as a positive number (which places it in the first quadrant) with the sign bit being routed to the polarity corrector for eventual translation of the processed data to the correct quadrant. For special constellation formats having data points on the major axes, such as partial response formats, "rounding" of data takes place, before truncation.

Referring to FIG. 14, the processing circuit 109 comprises a pair of logic circuits 143 and 153 and a pair of pipeline circuits 148 and 160. These circuits operate substantially independently on $D_x$ and $D_y$ for producing associated data streams on paths 162 and 163 that are independent of the particular quadrant to which they belong and which are essentially x and y component address words for addressing each of the RAM's. Logic circuit 143 buffers the MSB's on input paths 31A and 31B onto paths 144 and 145 as the x-and y-polarity bits. Logic circuit 143 also converts the remaining 5-bit digital words to the absolute values thereof on paths 146 and 147. The pipeline circuits realign the timing of the input data bits which may experience differing amounts of processing or propagation delays in the conventional manner for high speed digital processing. The pipeline circuits are not illustrated in FIGS. 16–17 for clarity illustration.

If the signal on path 121 is a binary O, which indicates that the selected constellation pattern is other than a partial response pattern, the logic circuit 153 truncates the signal on paths 149 and 150 to 4-bit words that are otherwise passed without modification. If a partial response pattern is selected by switch 115, a binary 1 on path 121 (from pattern select 103) enables logic circuit 153 to cause a "rounding" process. The logic circuit 153 adds a binary 1 to the LSB position of digital words on pths 149 and 150 if they already have a binary 1 as the LSB thereof. This operation is readily accomplished by adding a binary 1 to the LSB position on paths 149 and 150 and preventing overflow from the MSB position thereof. Logic circuit 153 then truncates the modified input signals and passes them as 4-bit address words on paths 156 and 157.

Logic circuit 153 shifts the x-and y-axes for the selected partial response (QPR) constellation pattern in the ROM by one-half of the LSB there. This means that in the ROM address the zone structure can be centered on or along the axes at x=0 and y+0 as is required for partial response signals, (e.g., as zone 309 is shifted to zone 310 in FIG. 12). This essentially provides an additional bit of address resolution without increasing the size of the ROM and RAM memories.

The truncation is performed to reduce the size of the digital addresses to 4-bit for both of the in-phase and quadrature components. Fast RAM's that are commercially available are the Hitachi HM10422 (having access times of 7 nanoseconds) and the Motorola MCM 10422 (with 10 nanoseconds access time); both are 8-bit RAM's. If slower speeds of operation are acceptable then RAM's having a larger number of address bits could be employed, thus providing higher resolution without the above processing.

More specifically, the processing logic circuit 109 shown in FIG. 14 comprises in-phase (x-axis) and quadrature-phase (y-axis) input signal processing channels 211 and 212 as shown in FIG. 17. Channels 211 and 212 convert 6-bit input signals on paths 31A and 31B to 4-bit words on paths 162 (A–D) and 163 (A–D). Only the in-phase processing channel 211 will be described in detail since the two channels are substantially identical. In FIG. 17 the in-phase or x-axis component of the input signal is a 6-bit word on paths 31A-1 to 31A-6 with the MSB or sign bit $b_5$ being on path 31A-6 and the LSB $b_0$ being on path 31A-1. This input signal is in 2's complement form in this embodiment of the invention since the A/D converters 30A and 30B in FIG. 2 produce output signals in 2's complement digital format. Thus, the MSB (on path 31A-60 is a binary 1 when the sign of the x component is negative in the second and third quadrants of a constellation pattern. Conversely, the MSB (on path 31A-6) is a binary 0 when the sign of the x-component is positive by being in the first or fourth quadrants of the constellation pattern. Similarly, the MSB (on path 31B-6) is a binary 1 when the sign of the y-component is negative in the third the fourth quadrants. Conversely, the MSB (on path 31B-6) is a binary 0 when the sign of the quadrature-phae component is positive in the first and second quadrants.

The in-phase (x-axis) processing channel 211 comprises an AND gate 214 which acts as a buffer, a plurality of exclusive -OR gates 216–220 for selectively inverting bits of the in-phase input signal, a second AND gate 222 which is enabled by a binary 1 on path 121 for selectively operating on the LSB when the system is operating on partial response signal constellation patterns, an adder circuit 224, and a plurality of OR gates 228 which are all enabled only when there is a carry output from the adder 224. The output signals of the OR gates 228 and 228' make up the 8-bit address to the RAM's (111 in FIG. 14). The exclusive-OR gates 216–220 are the major elements of the logic circuit 143 in FIG. 14. The AND gate 222, adder 224 and OR gates 226 are the major elements of logic circuit 153 in FIG. 14. The AND gate 222 is enabled by a binary 1 on path 121 when a partial response signal pattern is selected by unit 103. AND gate 214 (which acts as a buffer) has a logic 1 output with an in-phase input signal in the second and third quadrants. When the in-phase polarity bit is negative, the MSB on pth 31A-6 is a binary 1. A binary 1 on path 215 triggers all of the exclusive-OR gates 216–220 causing them to invert all of the magnitude or non-sign bits of the in-phase input signal on paths 31A-1 to 31A-5. This essentially folds the lower address space FIG. 12 about the x-axis and onto the upper half of the address space. Thus, the binary word 11001 in box 203 becomes the word 00110 in box 205 after the folding process. This essentially gives 5-bit resolution in an implementatin where there are only four output bits that can be used to address a RAM. The AND gate 222 is enabled by the partial response bit on path 121 and operates for producing a binary 1 on path 223 only when the LSB for the component of the input signal is a binary 1. This accomplishes the desired shifting of the x-axis of the zone pattern as was described previously so that input signals may be processed that are actually on the x-and y-axes. This binary 1 on path 223 is applied to the carry input of adder 224 for causing it to increment the 4-bit word on paths 225-1 to 225-4. The resultant signal from the adder 224 is coupled through OR gates 228 and is the 4-bit x-axis address that is applied to each of the RAM's. If the folded x-axis input signal on paths 31A corresponds to the lower most word position 11111 (ignoring the MSB or sign bit) in FIG. 13 or 7 for 3 level partial response, then adder 224 converts this word to 00000 which is incorrect and is referred to as overflow. The resultant carry bit in counter 224 in this instance is applied on path 226 to each of the OR gates 228 for forcing the 4-bit x-axis address to the word 1111 which is a more correct indication of the input signal.

The operation of the quadrature-phase (y-axis) channel 212 is substantially the same as was just described when AND gate 214' has a binary 1 output of an input signal in the third and fourth quadrants (where the y-axis channel polarity bit is negative such that the MSB on path 31B-6 is a binary 1) for producing a binary 1 on path 215'. Thus, the exclusive-OR gates 216'–220' are triggered to invert the 5 LSB's of the y-axis input signal on paths 31B only when this signal is in the third and fourth quadrants. This produces the same folding action as was described previously. With both axes folded. the system operates in or with respect to a signal quadrant (i.e., the first quadrant in FIGS. 28 and 29). The 4-bit output signal of the OR gates 228' is the Y-axis address which is applied to each of the RAM's.

The RAM's 111 (FIG. 16) are responsive to the 8-bit address words on paths 162–163 for outputting an associated 4-bit data output assignment word on the output paths of RAM 111A, a 4-bit gain error signal on the output paths of RAM 111B, and a 4-bit phase-error signal on the output paths of RAM 111C. The gain error signal does not require polarity correction for the correct quadrant. Correction of the polarity of the data output and phase-error signals is required, however, for translating this information back to the quadrant that actually contains the input signal ($D_x, D_y$).

Output Polarity Correction

The polarity correction circuit 113 in FIG. 14 comprises a data output polarity correction circuit 176; and phase correction circuits 178 and 180. Functionally the data output correction circuit 176 adjusts the first quadrant x-and y-component data values from RAM 111A, to correct data output value assignments for the quadrant in which the received signal actually appeared. Correction is not required for the amplitude (gain) error signal from RAM 111B. The logic circuit 178 produces a control signal on path 179 when it senses that the input signal is actually in the second or fourth quadrant. The phase correction circuit 180 is responsive to this control sigal to cause the reversing (2's complement) of the polarity of the phase-error signal from RAM 111C for these two quadrants of the input signal. No correction of the phase-error signal is required when the received data signal is in the first and fourth quadrants. More specifically, the output error signal of RAM 111C for the first quadrant drives the phase of the VCO 24 in FIG. 2 in the correct direction for reducing the phase difference between the received signal and the center of the appropriate zone of the particular zone pattern.

Figure 18:
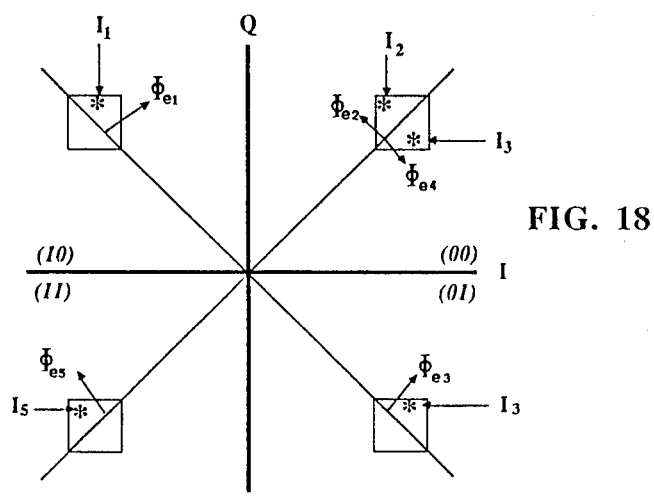
FIG. 18 is an x-y polar or grid plot that is useful in explaining the operation of the detector 101 in FIGS. 14-16 in which received data signals are processed with respect to a single quadrant.

Referring to FIG. 18, the phase error is represented by the line vectors. $I_1$ is an example of a received signal in the second quadrant having phase error $\Phi_{e1}$. When the second quadrant is folded about the y-axis, the received signal is processed with respect to the first quadrant, i.e., the absolute value thereof (which maps $I_1$ to position $I_2$). However, the resultant counter-clockwise arrow $\Phi_{e2}$ that represents the requisite phase error has the wrong or incorrect sense. Thus, correction of the sense (sign reversal) of the phase-error signal from RAM 111C is required for a received signal in the second quadrant. Similarly, when the phase error represented by the arrow $\Phi_{e3}$ for the received signal $I_3$ in the fourth quadrant is folded about the x-axis into the signal $I_4$ and arrow $\Phi_{e4}$ in the first quadrant, it is seen that the phase-error signal vector $\Phi_{e4}$ again has the wrong sense. Correction of the sense (polarity) of the phase-error signal is therefore also required in the fourth quadrant. For a received signal $I_5$ in the third quadrant, and the associated phase error represented by arrow $\Phi_{e5}$ both x and y are negative so that the third quadrant is folded about both the y-and x-axes). However, the arrow $\Phi_{e5}$ first folds into the arrow $\Phi_{e3}$ in the fourth quadrant and then into the arrow $\Phi_{e4}$ in the first quadrant which has the same sense (clockwise) as the arow $\Phi_{e5}$ in the third quadrant. Thus, correction of the direction of the phase-error signal is not required for the third quadrant.

A control signal for indicating that the direction of the phase error must be reversed for the second and fourth quadrants is obtained by applying the x-and y-polarity signals on paths 31A-6 and 31B-6 to the exclusive-OR gate 231 in FIG. 17. The operation of ex-OR gate 231 is tabulated below.

| POLARITY | | QUADRANT | Ex-OR |
|---|---|---|---|
| +=0, X | —=1 Y | # | 231 |
| + | + | 1 | 0 |
| — | + | 2 | 1 |
| — | — | 3 | 0 |
| + | — | 4 | 1 |

The output of Ex-OR gate 231 on path 179 is a binary 1 (high) for only the second and fourth quadrants. When the output of gate 231 is high, inverter 180 reverses (in 2's complement format) the sense of the phase-error signal from RAM 111C. But, when the control signal on path 179 is a binary 0 (low), indicating that the received signal is in either the first or third quadrant, inverter 180 passes the phase-error signal for RAM 111C without inversion.

The data assignment output from RAM 111A is an estimate of the correct in-phase and quadrature-phase data values for the received signal. Polarity correction of the data assignment is accomplished in circuit 176 shown in FIG. 16 and comprises two pairs of exclusive-OR gates 237–238 and 239–240. Each bit of the two pairs thereof from RAM 111A (that define the x-and y-data values) is applied to an associated one of the exclusive-OR gates 237–240. The x and y polarity bits on paths 144 and 145 are applied to the other inputs of exclusive-OR gates 237–238 and 239–240, respectively, OR-gates 237 and 238 are responsive to a binary 1 on path 144 (indicating that the received signal is either in the second or third quadrant) for inverting the associated in-phase channel data output bits from RAM 111A. Similarly, the OR-gates 239 and 240 are responsive to a binary 1 on path 145 (indicating that the received signal is in either the third or fourth quadrant) for inverting the associated y-channel data output bits from RAM 111A. The original x-and y-polarity bits on paths 144 and 145 are the MSB/polarity bits of the corrected in-phase and quadrature-phase data output signals.

Tracking Behavior and False Tracking Points.

Figure 19:
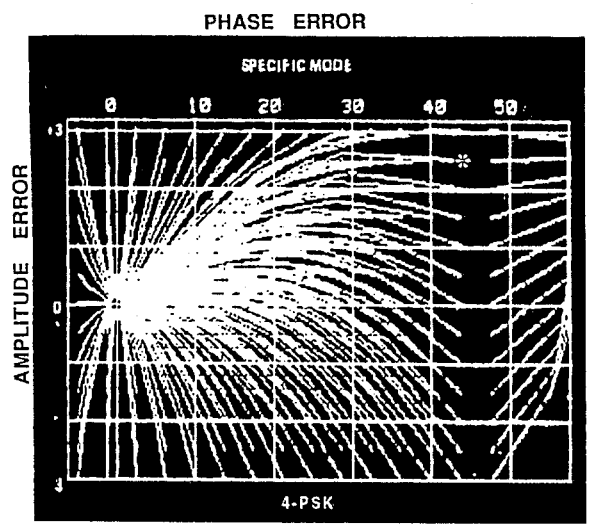
FIGS. 19, 20 and 21 are graphic representations illustrating the trajectory (i.e. movement) of the data points caused by phase and gain error of the tracking loop of FIG. 2 using the error detector in FIG. 8 over a period of time in response to an initial error.

Constellation patterns with complex structures, such as 16-QAM, 64-QAM, 9-QPR and 49-patterns, can cause the demodulator to exhibit false orientations, i.e. orientations incorrectly aligned. Before detailing a solution to this problem, it is helpful to appreciate the dynamics of a tracking loop and error detector in this demodulator. FIG.'s 19–21 are plots of the average amplitude and phase errors, which are also called tracking trajectories, and they illustrate how the tracking loop and detector 34 in the receiver respond to particular amplitude and phase errors. Ideally a perfect receiver should cause the input errors to quickly converge to a zero amplitude (0 db) and zero phase error (0°). And indeed FIG. 19 indicates such a response for a 4-PSK constellation pattern. Given any specific phase and gain errors, the receiver tracks the errors and reduces them to a zero level. For example, in FIG. 19 the point marked with "*" indicates an initial amplitude error of °2.5 dB and an initial phase error of approximately +43°. As the receiver trakes the initial error, it is continuously reduced to 0 dB and 0° as shown by the error track moving to the far left of the figure. FIG. 19 indicates that for any amplitude error between +3 dB and any phase error from −5° to +55°, the tracking loop/detector will cause an error level convergence to zero. There are no undesired false stable orientations of the receiver. However, this is not the situation for all modulation formats.

Figure 20:
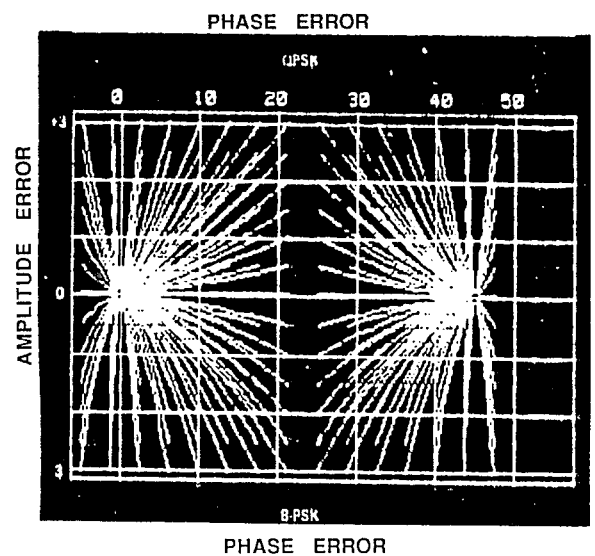

For an 8-PSK input signal, there are two stable format orientations, either of which is correct. This is illustrated in the tracking trajectory in FIG. 20 which indicates that the receiver drives the phase and gain error so that the resultant gain error is on the 0 dB line and the resultant phase error is centered either at 0° or 45°. Either of these is correct for 8-PSK signals since with modulation format has an eight-fold symmetry, i.e., it has data points at every 45°. The problem of false lock orientation is evident in FIG. 21 which illustrates the tracking trajectory of the demodulator for 16-QAM input signal. For phase errors <20° the receiver correctly shifts the phase and amplitude of the ($D_x$,$D_y$) input signals to a point of zero phase and gain error. However, for angles or phase errors >30° the receiver drives the input signals to several possible incorrect stable orientations. Notwithstanding the sizeable phase and amplitude error offsets, detector 34 outputs zero level $\Phi_e$ and $G_e$ signals on paths 40 and 42, and therefore, the receiver stays locked up on an incorrect orientation.

Figure 23:
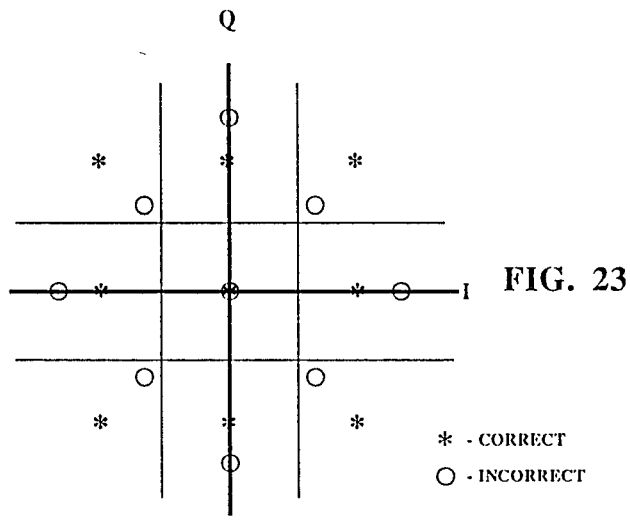
FIG. 23 is a graphic representation of a correctly oriented (*) and incorrectly oriented (o) 3-level QPR constellation pattern on the axes of the zone pattern in the demodulator.
Figure 21:
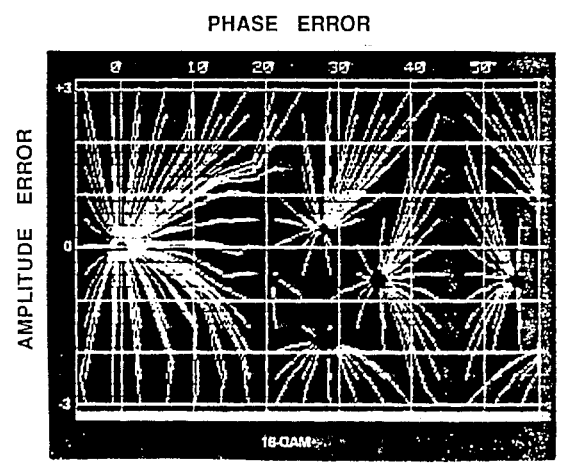
Figure 22:
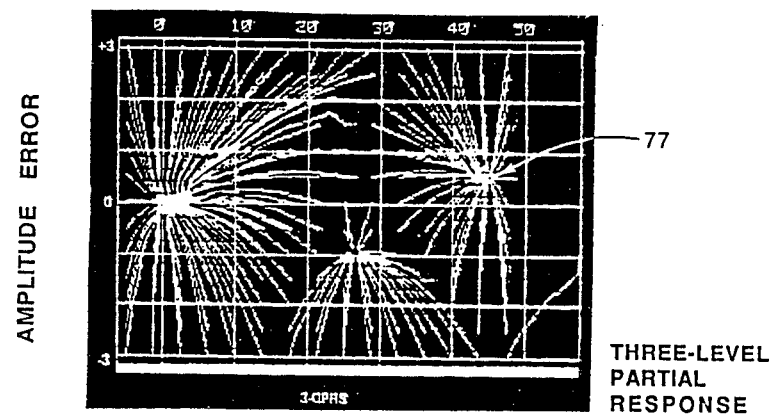
FIG. 22 is a graphic representation illustrating the trajectory of certain data points caused by phase and gain error in the tracking loop of FIG. 2 using the error detector in FIG. 8 over a period of time in response to an initial error and which is useful in showing the tracking of the incorrect orientation of the constellation pattern shown in FIG. 23.

As is illustrated in FIG. 21 and 22, higher order mode formats such as 16-QAM and 3-level partial response have the problem of false but stable phase lock orientations which are not seen in n-phase (QPSK, 8-PSK) modulation formats. This is illustrated in a slightly different manner in FIG. 23. Two 3-level partial response constellation patterns are illustrated: one which is correctly oriented with "no-error" constellation points indicated by "*", and one which is incorrectly oriented by +45° (with respect to the receiver developed coordinates shown) with "no-error" data points designated by circles "o". The data points (designated by an *) exactly coincide with the centers of the respective zones. Each of the incorrectly oriented signal points, o's, lie on the associated reference vector lines which go from the center of the coordinate system to a reference point. The computed phase error $\Phi_e$ (cross product) is zero for this situation and therefore, the receiver would interpret this phase orientation to be correct and stable. The amplitude error portion of the receiver operates in a similar manner for concluding that the amplitude of the received signal points ($D_x$,$D_y$) and at the correct level. The input signal points lying along the 45° reference vector lines have an amplitude that is slightly less than the requisite amplitude to be in the center of a zone. This apparent error is balanced, however, by the input signal point line along the x and y axes of the reference coordinate system whose amplitude is a similar amount greater than it should be for it to lie in the center of the zone pattern (i.e., on an associated reference point). These two erroneous amplitude levels therefore balance one another and the receiver concludes that the amplitude is being tracked correctly. For a 3-level partial response constellation pattern this condition is represented in FIG. 22 by the stable tracking point 77 at a +45° phase error and a +0.5 dB gain error. This results in incorrect decoding of the input signal and produces useless (erroneous) data. This problem is identical in its extent and solution for the one or two-dimensional detectors.

False-Lock Solution—Kick Logic

Again referring to FIG. 2, the phase-error and gain-error signals $\Phi_e$ and $G_e$ on paths 42 and 40 are applied to a kick logic circuit 76. The kick logic circuit produces a control signal on path 43, which is digitally added with $\Phi_e$ in digital adder 65. The output of this adder on path 45 controls the phase of VCO 24 through D/A 44 and servo compensation circuit 46. Functionally the kick logic circuit produces an output pulse whenever the magnitude of the time averaged error signals $\Phi_e$ or $G_e$ exceed a predetermined level. A pulse from the kick logic circuit causes the tracking loop and oscillator 24 to jump to a new phase and amplitude lock-point. The purpose of the kick-logic circut is to detect and correct for the situation where the received signals are tracked in an incorrect constellation pattern orientation as was described in conjunction with FIGS. 21 and 22. In these incorrect orientations or false tracking situations, error detector 34 generates average $\Phi_e$ and $G_e$ error signals equal to zero. Although the average values are zero, the instantaneous error values of individual ($D_x$,$D_y$) points can be quite large since the ($D_x$,$D_y$) input signals do not correctly fit into the programmed constellation zone structure. By processing the unsigned magnitude of the error values, instead of looking only at the algebraic or signed average values, it is possible to distinguish between correct and incorrect receiver orientations.

Figure 24:
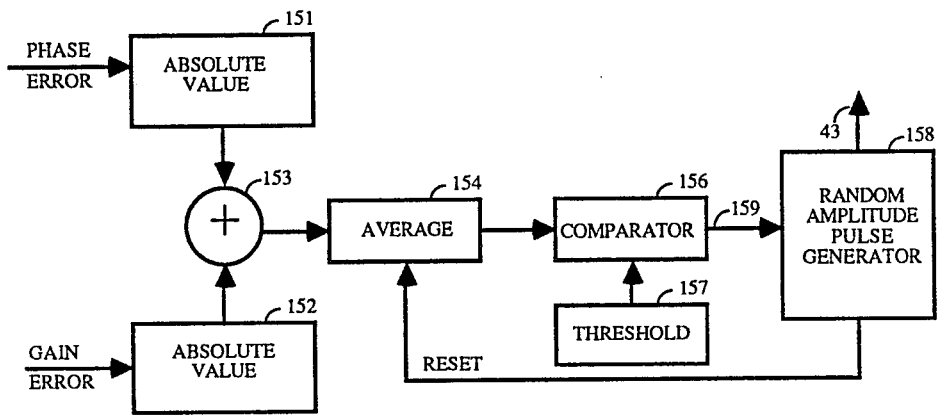
FIG. 24 is a circuit schematic and block diagram of one implementation of a kick-logic circuit (76 in FIGS. 2 and 8) in accordance with one aspect of this invention.
Figure 25:
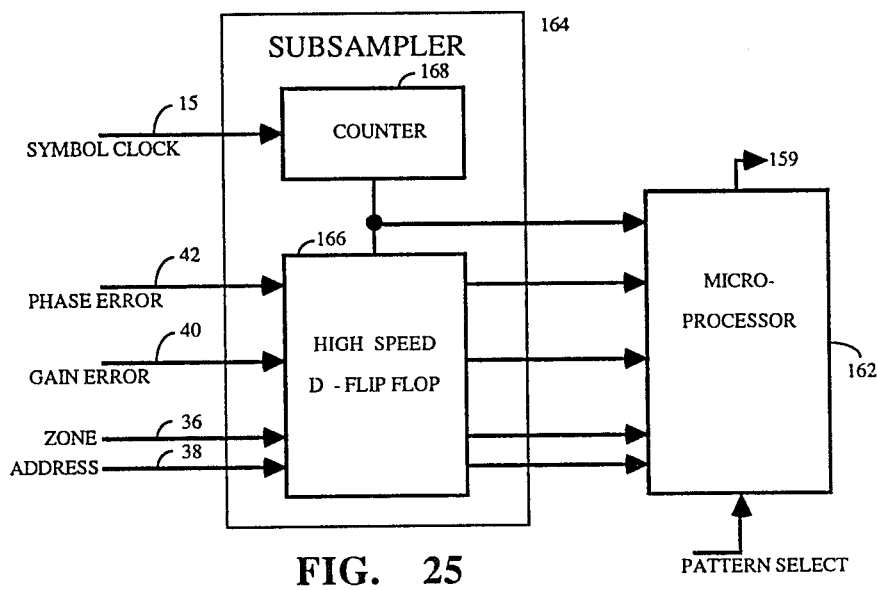
FIG. 25 is a circuit schematic and block diagram of another implementation of the kick-logic circuit in accordance with another aspect of this invention.

Two processing techniques can accomplish this processing function. One such processing technique is most useful in situations of little or no noise compared to the level of the received input signal. In this case a detection and threshold comparison circuit (or processing algorithm) can be implemented to detect an incorrect orientation (see FIG. 24). When more noise is present with the received signal level, the magnitudes of the error voltages will be large due to noise and therefore, the additional error magnitude due to incorrect orientation is not as readily recognizable. A kick-logic circuit for operating in this environment is shown in FIGS. 24 and 25. In this situation the error signals are first processed by time averaging the error voltages separately for the signals received in each zone. The purpose of time averaging is to reduce the effect of variations caused by random errors such as white noise. The error magnitude due to incorrect orientation will not be reduced, however, by this time averaging process. Therefore, after an appropriate amount of time averaging, an averaged error signal is processed as is described in relation to FIG. 24. A simple threshold function or circuit is used to distinguish between correct and incorrect orientations.

The corrective action that must be taken, regardless of which of the above described processing technique is employed to determined whether the received constellation pattern is incorrectly or correctly oriented, is a process of "kicking" the phase orientation a number of degrees. The phase shift kick is randonly selected so that the tracking loop circuitry will have a chance to reacquire the correct constellation pattern orientation. The exact angle or amount of the kick is preferably randomly chosen so that it is not possible for the constellation to be systematically kicked from one incorrect orientation to another incorrect orientation in such a systematic way that it will never find a correct orientation. When the amount of reorientation is randomly selected, such systematic effects will be removed. The amplitude of the phase kick preferably randomly varies in the range of from 10° to 60°. After the phase kick, the time averaging circuitry that is inputting information for the threshold comparison (156, 157) is reset or cleared so that new information on the error variations is used in the next decision as to the correct or incorrect orientation. This assures that the previous incorrect orientation information will not bias a new decision.

Kick-Logic Detailed Description

A block diagram of a fundamental kick-logic processing circut 150 is shown in FIG. 24. The phase and gain errors are applied to absolute value circuits 151 and 152 that change that signed values of the inputs thereto to the absolute values thereof. These absolute value signals are summed by adder 153 and are applied to a low pass filter type of time averaging device 154. Alternatively, circuit 154 may be an integrate and dump type of processing circuit. A digital comparator 156 compares the time-average value of the amplitudes of the error is signal sum to a threshold set by circuit 157. If, on the basis of this comparison, the time-averaged variation is higher than the threshold, the output of comparator 156 on path 159 triggers pulse generator 158 to produce a pulse of random amplitude on path 43 (the kick pulse signal) which is applied to adder 65 in FIG. 2. The sum of the phase error and kick pulse signals is an 8-bit byte on path 45' which is coupled through circuits 44 and 46 in FIG. 2 for driving the VCO 24. This causes the received constellation pattern to be rotated a random amount.

Under conditions in which there is a large amount of white noise at the receiver input at path 10, time averaging is performed on the error signals before the error magnitude thereof can be summed and compared with a threshold as is done in FIG. 24. A preferred implementation of this concept is shown in FIG. 25 and comprises a slow speed general purpose processor 162 such as a microprocessor. By virtue of the slow speed of a microprocessor, input signals thereto are subsampled by circuit 164 which comprises a high speed D-flip flop 166 that is driven by a counter 168. The counter 168 sets a time between samples that is the amount of time necessary for the processor to complete its processing. The output of the counter triggers storage device 166, such as a plurality of D-flip flops, which store the phase-error value, gain-error value, and output data assignment. The purpose of the high speed subsampler is to assure that the phase error, gain error and data assignment are all from a single input signal constellation state. The output of the subsampler 164 is passed on to the microprocessor circuitry 162. After the amount of time required for microprocessor 162 to process the data in the manner described hereinafter the subsampler 164 samples and holds another signal state sample for processing. It should be noted that the subsampling circuit 164 is not an inherent part of the kick-logic function. It is only needed if a slow speed general purpose processor is used in accomplishing this function. If high speed orientation correction is desired, then a special high speed processor 162 may be utilized and the subsampler 164 is not needed.

Figure 26:
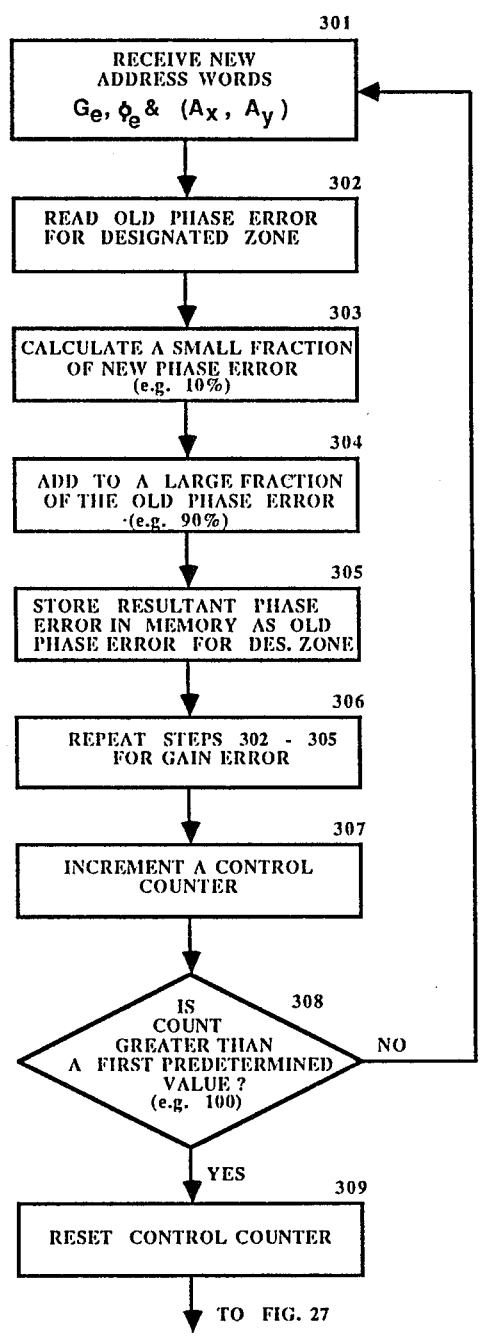
FIG. 26 is a flow chart diagram describing a portion of the operation of the microprocessor in FIG. 25.
Figure 27:
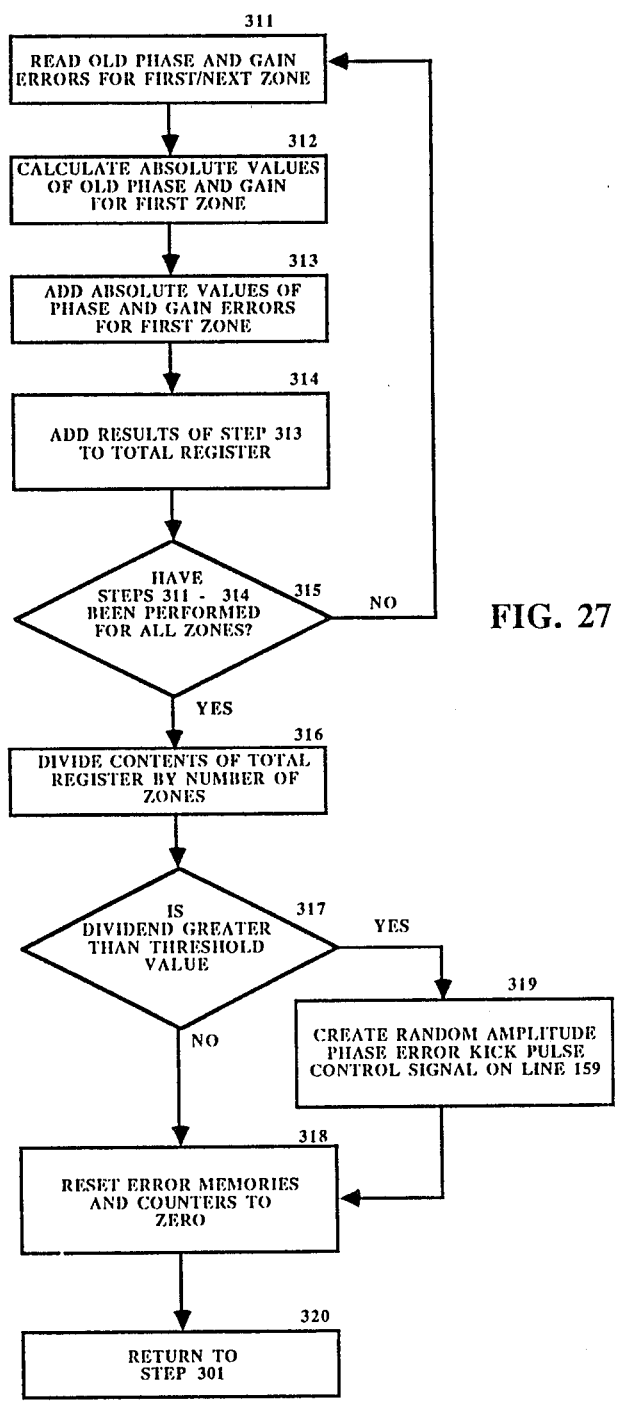
FIG. 27 is also a flow chart diagram describing a portion of the operation of the microprocessor in FIG. 25.

The general purpose processor or microprocessor circuit 162 implements the process shown in the logic flow diagrams FIGS. 26 and 27. The general purpose of the algorithm there is to implement the process as described in the immediately preceeding description that references FIGS. 24–25. Initially the process time-averages the errors for each designated zone in the constellation pattern. After the required amount of time averaging the error for all zones, the error magnitudes are returned to a part of the algorithm which implements the process that is shown in FIG. 24. In the process in FIG. 24, the absolute values of the phase and amplitude errors are calculated, added together, and then low pass filtered or averaged, the result being compared with a fixed threshold. If the average error is greater than a threshold value then a command is given to pulse generator circuit 158 which then generates a random amplitude fixed width pulse required to get a 10°-60° step in the phase of the received signal.

A more detailed description of the time averaging and the threshold testing process for the embodiment in FIG. 25 is shown in FIG. 26. Steps 301-307 implement the time averaging of the error signals in each designated zone. When a signal is received the zone identification or output data on paths 36 and 38 as an address is used to look up in the microprocessor's memory a running total of the old average phase error and the old average amplitude error for that designated zone (301-302). The new error values are functionally added in an algebraic or signed manner to produce new SUM values (303). Implementing the low pass filter approach with the processor 162, the fractions of the old and new should add to 1.0. The next step 305 stores the resultant error signals in the proper memory locations for the designated zone. If an integrate and dump technique is employed with processor 162 for doing the time averaging then the new and old are simply added for the number of samples. After this processing is completed a timer or counter circuit is incremented and its total value is checked. These latter steps 307 and 308 require that a fixed number of data points be averaged before terminating the averaging process and making a comparison that is similar to what is done in FIG. 24. If the processing time is such that a prescribed number of data points have not yet been processed then the process goes back to step 301 and is repeated for new data values. Once error signals for a appropriate amount of data (as determined by the counter) have been averaged the algorithm in FIG. 27 is implemented.

As stated previously the program of FIG. 27 implements many of the steps in FIG. 24. In the process in FIG. 27 steps 311-315 sequentially increment through all of the zone addresses, summing into a total register a new running total of the SUM of the absolute values of the average phase errors and the average gain errors. The result in the total register (315) is divided by the number of zones (based on the constellation ident —54) to produce a more normalized value thereof (316). The SUM of the averages that is contained in the total register is then compared to a threshold value in step 317. If the resultant from step 316 is greater than the threshold value, the processor 162 generates a command on path 159 that causes generator 158 to produce a random amplitude fixed width pulse, for example, which causes the 10°-60° amount of phase shift. If the resultant from step 316 is less than the threshold then the process continues by resetting the total registers and counters and memory locations for the old phase and gain errors to prescribed value (318) and returning the process to step 301 at the top of FIG. 26.

While the invention has been described with reference to its preferred embodiments, it will be understood by those skilled in the art that various changes may be made and equivalents may be substituted for elements theeof without departing from the true spirit and scope of the invention. In addition, many modifications may be made to adapt a particular situation or material to the teaching of the invention without departing from its essential teachings. By way of example ROM's 56 and 58 in FIG. 8 may be implemented with logic circuits that are formed of discrete components and circuits. Also the embodiments of FIGS. 9 and 11 are only illustrative of the concept of generating and storing error signals for as many possible received signal states-points in each zone as is practical. Where extensive memory is available and lower speed operation is acceptable then almost unlimited resolution is possible. The scope of this invention is therefore to be determined by the appended claims rather than the aforementioned detailed descriptions.

What is claimed is:

1. In a digital communication system including a transmitter for generating a digitally modulated carrier signal having any one of a known plurality of phase-amplitude modulation formats, each format characterized by a unique constellation pattern of transmitted phase-amplitude states, and a receiver for demodulating the digitally modulated carrier signal, apparatus for demodulating the digitally modulated carrier signal and for locking onto to the phase and amplitude of the digitally modulated carrier, said apparatus comprising:

receiving means for receiving the digitally modulated carrier signal;

splitting means for splitting the received digitally modulated carrier signal into in-phase and quadrature-phase signal components;

A/D converter means for periodically digitizing said in-phase and quadrature-phase signal components to form the signal pair ($D_x, D_y$), $D_x$ being the periodic digital representation of the in-phase signal component and $D_y$ being the periodic digital representation of the quadrature-phase component;

identifying means for identifing the particular modulation format of said received digitally modulated carrier signal;

first memory means for periodically receiving said $D_x$ in-phase signal component as a memory address, said first memory means containing for each modulation format first and second tables, each of said first tables for converting values of $D_x$ into corresponding $R_x$ reference values, and each of said second tables for converting values of $D_x$ into corresponding $A_x$ data assignment values;

second memory means for periodically receiving said $D_y$ quadrature-phase signal component as a memory address, said second memory means containing for each modulation format third and fourth tables, each of said third tables for converting values of $D_y$ into corresponding $R_y$ reference values, and each of said fourth tables for converting values of $D_y$ into corresponding $A_y$ data assignment values, where (a) a corresponding reference pair ($R_x, R_y$) and a corresponding assignment pair ($A_x, A_y$) exist for each ($D_x, D_y$) signal pair, (b) a one-to-one correspondence exists between each ($R_x, R_y$) reference pair and one of the transmitted phase-amplitude states mapped onto a two-dimensional x,y signal space and, (c) a one-to-one correspondence exists between each ($A_x, A_y$) assignment pair and one of the transmitted phase-amplitude states mapped onto a two-dimensional x,y signal space;

selection means coupled to said first and second memory means for selecting each of said tables for said identified modulation format;

first logic means coupled to said first memory means for generating the digital signal $E_x$ by subtracting $R_x$ from $D_x$;

second logic means coupled to said second memory means for generating the digital signal $E_y$ by subtracting $R_y$ from $D_y$;

third logic means for generating a phase-error signal $\Phi_e$, where $$\Phi_e = (R_y E_x - R_x E_y) \text{ and}$$

a gain-error signal $G_e$, where $$G_e = (R_x E_x + R_y E_y);$$

first feedback means coupled to said receiving means for correcting the amplitude of said digitally modulated carrier signal in accordance with said gain-error signal $G_e$; and, second feedback means coupled to said splitting means for correcting the phase of said in-phase and quadrature-phase signal components in accordance with said phase-error signal $\Phi_e$.

2. The apparatus of claim 1 wherein said first feedback means further comprises:

first averaging means for averaging a plurality of gain-error signals $G_e$ and for varying the amplitude of said digitally modulated carrier signa in accordance with said averaged gain-error signals.

3. The apparatus of claim 2 wherein said second feedback means further comprises:

second averaging means for averaging a plurality of phase-error signals $\Phi_e$ and for varying the phase of said in-phase and quadrature-phase signal components in accordance with said averaged phase-error signals $\Phi_e$.

4. The apparatus of claim 3 wherein said splitting means further comprises:

oscillator means for generating a local reference signal having substantially the same frequency as the digitally modulated carrier signal and having a control input for varying the frequency of said reference signal;

second splitting means coupled to said receiving means for splitting the modulated carrier signal into first and second modulated signals;

first mixing means for mixing said first modulated signal with said local reference signal and generating said in-phase signal component; and, second mixing means for mixing said second modulated signal with said local reference signal phase shifted by 90° and for generating said quadrature-phase signal component.

5. The apparatus of claim 4 further comprising:

clock recovery means coupled to said receiving means for recovering the encoding interval period of the modulated carrier signal.

6. The apparatus as in claim 5 wherein said identifying means generates a digital pattern select signal having encoded therein said particular modulation format.

7. The apparatus as in claim 6 wherein said selection means further comprises a data path combining said digital pattern select signal with said $D_x$ and $D_y$ addresses at said first and second memory means respectively, for selecting each of said tables.

8. The apparatus as in claim 7 wherein said first and second memory means further comprise:

a pair of ROM look-up table devices.

9. A demodulator for demodulating a digitally modulated carrier signal having one of a known plurality of modulation formats, each format characterized by a unique constellation pattern of phase-amplitude states, said demodulator comprising:

first mixing means for receiving said digitally modulated carrier signal and for mixing said signal with a local reference signal for deriving in-phase and quadrature-phase signal components of the digitally modulated carrier signal;

A/D digitization means for periodically digitizing said in-phase and quadrature-phase signal components to form the signal pair $D_x$ and $D_y$, $D_x$ being the digital representation of the in-phase signal component and $D_y$ being the digital representation of the quadrature-phase component, said signal pair representing a signal point in a two-dimensional phase-amplitude signal space having a coordinate origin representing a zero signal amplitude;

first converting means for converting each of said $D_x$ digital signal components into one of a plurality of reference values $R_x$ by mapping each of said $D_x$ digital signal components into a plurality of one-dimensional zones each having $R_x$ center values, said zones being a function of the one modulation format of said digitally modulated carrier signal;

second converting means for converting each of said $D_y$ digital signal components into one of a plurality of reference values $R_y$ by mapping each of said $D_y$ digital signal components into a plurality of one-dimensional zones orthogonal to said $R_x$ zones, each zone having $R_y$ centers, each pair of $R_x$ and $R_y$ reference values representing a point in said two-dimensional signal space which corresponds to one of the transmitted phase-amplitude states, said zones being a function of the one modulation format of said digitally modulated carrier signal;

third converting means for converting each of said $D_x$ digital signal components into a data assignment signal $A_x$;

fourth converting means for converting each of said $D_y$ digital signal components into a data assignment signal $A_y$, each pair of said data assignment signals $A_x$ and $A_y$ identifying one of the mapped two-dimensional zones corresponding to a transmitted phase-amplitude state, said assignment pair thereby representing a form of the modulation applied to said carrier;

first logic circuit means for detecting the phase-error, $\Phi_e$, between the phase angle associated with the modulated carrier signal and the phase angle associated with said local reference signal;

second logic circuit means for detecting the gain-error, $G_e$, between the amplitude associated with the signal pair $D_x$ and $D_y$ and the amplitude associated with the corresponding pair of reference values $R_x$ and $R_y$;

first feedback means responsive to said phase-error $\Phi_e$ for coupling said phase-error signal $\Phi_e$ to said first mixing means, said mixing means including means for adjusting the phase of said local reference signal in response to said phase-error signal $\Phi_e$; and second feedback means responsive to said gain-error signl $G_e$ for coupling said gain-error signal $G_e$ to said first mixing means, said mixing means including means for adjusting the amplitude of said digitally modulated carrier signal prior to said digitization and in accordance with said gain-error signal $G_e$.

10. The demodulator of claim 9 wherein said first logic circuit means further comprises:

means for forming the digital error signal $E_x$ by digitally subtracting $R_x$ from $D_x$;

means for forming the digital error signal $E_y$ by digitally subtracting $R_y$ from $D_y$;

third logic circuit means connected to said first and second logic means, said third logic means for generating said phase-error signal $\Phi_e$, by computing the quantity $(R_y E_x - R_x E_y)$.

11. The demodulator of claim 10 wherein said second logic circuit means further comprises:

fourth logic circuit means connected to said first and second logic circuit means, said fourth logic circuit means for generating said gain-error signal $G_e$ by computing the quantity $(R_x E_x + R_y E_y)$.

12. The demodulator of claim 11 wherein said second feedback means further comprises:

first averaging means for averaging a plurality of gain-error signals $G_e$ and for coupling the averaged gain-error signals to said first mixing means for varying the amplitude of said digitally modulated carrier signal in accordance therewith.

13. The demodulator of claim 12 wherein said first feedback means further comprises:

second averaging means for averaging a plurality of phase-error signals $\phi_e$ and for coupling the averaged phase-error signals to said first mixing means for varying the phase of said in-phase and quadrature-phase signal components in accordance therewith.

14. The demodulator as in claim 13 further comprising:

identifying means coupled to said first, second, third, and fourth converting means, said means identifying the particular one modulation format of the digitally modulated carrier signal and generating a pattern select signal corresponding to said identified format for controlling the zone mapping of each of said converting means.

15. The demodulator as in claim 14 wherein said first mixing means further comprises:
   splitting means for separating the modulated carrier signal into first and second modulated signals having the same amplitude;
   oscillator means for generating said local reference signal having substantially the same frequency as the digitally modulated carrier signal and having a control input for varying the frequency of said reference signal;
   second mixing means for mixing said first modulated signal with said local reference signal and generating said in-phase signal component; and,
   third mixing means for mixing said second modulated signal with said local reference signal phase shifted by 90° and generating said quadrature-phase signal component.

16. The demodulator as in claim 14 wherein said plurality of modulation formats includes 16-QAM.

17. The demodulator according to claim 15 in which said first converting means is a ROM device.

18. The demodulator according to claim 17 in which said second converting means is a ROM device.

19. The demodulator as in claim 15 further comprising:
   clock recovery means coupled to said first mixing means, said recovery means generating a clock signal corresponding to the encoding interval period of said modulated carrier signal, said clock signal controlling the digitizing period of said A/D digitization means.

20. In a digital communication system including a transmitter for generating a digitally modulated carrier signal having any one of a known plurality of phase-amplitude modulation formats, each format characterized by a unique constellation pattern of transmitted phase-amplitude states, and a receiver for demodulating the received digitally modulated carrier signal, apparatus for demodulating the received digitally modulated carrier signal comprising:
   oscillator means for producing a pair of local reference signals having substantially the same frequency as the carrier signal and having a 90° phase difference with respect to each other;
   mixer means coupled to said oscillator means for splitting the digitally modulated carrier signal into in-phase and quadrature-phase signal components by separately mixing said digitally modulated carrier signal with said pair of local reference signals;
   means for periodically converting said in-phase and quadrature-phase signal components into a pair of digital signals $D_x$ and $D_y$, $D_x$ beng the digital in-phase signal component and $D_y$ being the digital quadrature-phase component, said digital signal pair representing a phase-amplitude state in a two-dimensional signal space;
   a first memory means for receiving said $D_x$ signal components as an address, said first memory means having a plurality of first memory banks, one of which is associated with the one modulation format of the digitally modulated carrier signal, each of said first memory banks having look-up tables for converting values of $D_x$ into corresponding multi-bit values of $R_x$, where the plurality of $R_x$ values correspond to the projection of the phase-amplitude states of the transmitted digitally modulated carrier signal on one axis of a two-dimensional signal space;
   a second memory means for receiving said $D_y$ signal components as an address, said second memory means having a plurality of second memory banks, one of which is associated with the one modulation format of the digitally modulated carrier signal, each of said memory banks having look-up tables for converting values of $D_y$ into corresponding multi-bit value of $R_y$, where the plurality of $R_y$ values correspond to the projection of the phase-amplitude states of the transmitted digitally modulated carrier signal on a second axis of a two-dimensional signal space, said second axis being orthogonal to said one other axis;
   means for generating a data assignment value, $A_x$, by selecting a predetermined plurality of adjacent bits from $R_x$;
   means for generating a data assignment value, $A_y$, by selecting a predetermined plurality of adjacent bits from $R_y$, said $A_x$ and $A_y$ corresponding to a digital value for a phase-amplitude state of said received digitally modulated carrier signal;
   first logic circuit means for receiving said $R_x$, $R_y$, $D_x$ and $D_y$ digital signals, for detecting therefrom the phase difference between the phase angle associated with the modulated carrier signal and the phase angle associated with said pair of local reference signals, and for generating a periodic phase-difference signal $\Phi_e$;
   second logic circuit means for receiving said $R_x$, $R_y$, $D_x$ and $D_y$ digital signals, for detecting therefrom the gain difference between the amplitude associated with the signal pair $D_x$ and $D_y$ and the amplitude associated with the corresponding pair of reference values $R_x$ and $R_y$, and for generating a periodic gain-difference signal $G_e$;
   first feedback means for coupling said phase-difference signal $\Phi_e$, to said oscillator means and for adjusting the phase thereof in accordance with said phase-difference signal $\Phi_e$; and,
   second feedback means for coupling said gain-difference signal $G_e$ to said mixer means and for adjusting the amplitude of said digitally modulated carrier signal in accordance with said gain-error signal $G_e$.

21. The apparatus as in claim 20 wherein said first feedback means further comprises:
   first averaging means for averaging a plurality of said phase-difference signals $\Phi_e$ and for varying the phase of said oscillator means in accordance with said averaged phase-difference signals.

22. The apparatus as in claim 21 wherein said second feedbck means further comprises:
   second averaging means for averaging a plurality of said gain-difference signals $G_e$ and for varying the amplitude of said digitally modulated carrier signal in accordance with said averaged gain-difference signals.

23. The apparatus as in claim 20 wherein said first and second logic circuit means further comprise:
   third logic circuit means for forming the digital error signal $E_x$ by digitally subtracting $R_x$ from $D_x$;

fourth logic circuit means for forming the digital error signal $E_y$ by digitally subtracting $R_y$ from $D_y$; and fifth logic circuit means for generating said phase difference signal $\Phi_e$, by computing $(R_y E_x - R_x E_y)$ and for generating said gain difference signal $G_e$, by computing $(R_x E_x + R_y E_y)$.

24. The apparatus as in claim 20 further comprising: receiving means for receiving the digitally modulated carrier signal and for providing said digitally modulated carrier signal to said mixer means.

25. The apparatus as in claim 24 further comprising: clock recovery means coupled to said receiving means for recovering the encoding interval period of the modulated carrier signal.

26. The apparatus as in claim 25 further comprising: identifying means for receiving said $D_x$ and $D_y$ digital signal components, for identifying the particular one modulation format of the digitally modulated carrier signal and for generating a pattern select signal corresponding to said identified format, said pattern select signal for selecting said one memory bank in each of said first and second memory means which is associated with said identified modulation format.

27. The apparatus as in claim 26 wherein each of said first and second memory means further comprises a ROM device.

28. The apparatus as in claim 27 wherein said plurality of modulation formats includes 8-PSK.

* * * * *